United States Patent
Kramer et al.

(10) Patent No.: US 10,853,870 B2
(45) Date of Patent: *Dec. 1, 2020

(54) PRODUCT AND LID IDENTIFICATION FOR SENSOR-BASED DEVICE

(71) Applicant: Amazon Technologies, Inc., Seattle, WA (US)

(72) Inventors: Allison Kramer, Seattle, WA (US); Kevin Chu, Seattle, WA (US); Samuel Stevens Heyworth, Seattle, WA (US); Devon Merritt, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 247 days.

This patent is subject to a terminal disclaimer.

(21) Appl. No.: 15/928,370

(22) Filed: Mar. 22, 2018

(65) Prior Publication Data
US 2019/0295149 A1 Sep. 26, 2019

(51) Int. Cl.
*G06Q 30/06* (2012.01)
*G06F 21/31* (2013.01)
*G06Q 10/08* (2012.01)

(52) U.S. Cl.
CPC ......... *G06Q 30/0633* (2013.01); *G06F 21/31* (2013.01); *G06Q 10/08* (2013.01)

(58) Field of Classification Search
USPC ......................................................... 705/29
See application file for complete search history.

(56) References Cited

U.S. PATENT DOCUMENTS

| 5,168,445 A | 12/1992 | Kawashima et al. |
| 5,235,509 A | 8/1993 | Mueller et al. |

(Continued)

FOREIGN PATENT DOCUMENTS

| WO | WO2016149674 | * | 9/2016 |
| WO | 2017118845 | | 7/2017 |
| WO | 2016149674 | | 9/2018 |

OTHER PUBLICATIONS

"Amazon Dash Replenishment", XP054979477, Available online at URL:https://www.youtube.com/watch?v=vTYcWG 6BIDY, Jan. 19, 2016, 3 pages.

(Continued)

*Primary Examiner* — Garcia Ade
(74) *Attorney, Agent, or Firm* — Kilpatrick Townsend & Stockton LLP

(57) ABSTRACT

Techniques for identifying an automatic replenishment device (ARD) to item pairing based on an interaction by a user with a component of the ARD are disclosed herein. In embodiments, information from an ARD may be received that corresponds to an identify request based at least in part on an interaction with a component of the ARD. The information may include a device identifier for the ARD and a registration token. ARD data that identifies the ARD and the item associated with the ARD may be determined based at least in part on the received information. In accordance with at least one embodiment, a notification may be generated based at least in part on the ARD data where the notification is configured to present the item associated with the ARD. The notification may be transmitted to a user device associated with the ARD.

20 Claims, 15 Drawing Sheets

(56) References Cited

U.S. PATENT DOCUMENTS

| | | | |
|---|---|---|---|
| 6,204,763 B1* | 3/2001 | Sone | A47G 29/141 221/2 |
| 8,005,761 B1 | 8/2011 | Braumoeller et al. | |
| 8,260,672 B2 | 9/2012 | Weel et al. | |
| 8,718,620 B2 | 5/2014 | Rosenblatt | |
| 9,267,834 B2 | 2/2016 | Chowdhary et al. | |
| 9,619,831 B1 | 4/2017 | Kumar et al. | |
| 10,360,617 B2 | 7/2019 | High et al. | |
| 10,438,276 B2 | 10/2019 | Godsey et al. | |
| 10,445,672 B2 | 10/2019 | Renfroe | |
| 10,445,819 B2 | 10/2019 | Renfroe | |
| 10,474,987 B2 | 11/2019 | Corona et al. | |
| 2006/0206373 A1 | 9/2006 | Blair et al. | |
| 2007/0162326 A1 | 7/2007 | Weel et al. | |
| 2008/0113614 A1 | 5/2008 | Rosenblatt | |
| 2010/0076903 A1 | 3/2010 | Klingenberg et al. | |
| 2011/0153466 A1 | 6/2011 | Harish et al. | |
| 2012/0038456 A1 | 2/2012 | Pikkarainen et al. | |
| 2013/0038455 A1 | 2/2013 | Chowdhary et al. | |
| 2014/0095479 A1 | 4/2014 | Chang et al. | |
| 2014/0203040 A1 | 7/2014 | Clark et al. | |
| 2015/0178654 A1 | 6/2015 | Glasgow et al. | |
| 2015/0186836 A1 | 7/2015 | Chouhan et al. | |
| 2015/0278912 A1 | 10/2015 | Melcher et al. | |
| 2015/0302510 A1 | 10/2015 | Godsey et al. | |
| 2015/0329260 A1 | 11/2015 | Singh | |
| 2016/0019780 A1 | 1/2016 | Gettings et al. | |
| 2016/0040580 A1 | 2/2016 | Khaled et al. | |
| 2016/0132821 A1 | 5/2016 | Glasgow et al. | |
| 2016/0203431 A1 | 7/2016 | Renfroe | |
| 2016/0314514 A1 | 10/2016 | High et al. | |
| 2017/0201057 A1 | 7/2017 | Ahlawat et al. | |
| 2017/0300984 A1 | 10/2017 | Hurwich | |
| 2018/0053140 A1 | 2/2018 | Baca et al. | |
| 2018/0260779 A1 | 9/2018 | Singh et al. | |
| 2018/0308514 A1 | 10/2018 | Li et al. | |
| 2019/0108483 A1 | 4/2019 | Tineo | |
| 2020/0105409 A1 | 4/2020 | Kochar et al. | |

OTHER PUBLICATIONS

"Amazon Dash Replenishment for Developers", XP054979476, Available online at URL:https://www.youtube.com/watch?v=WS42WcuSyVU, Jan. 30, 2017, 5 pages.

"Dash Replenishment Service CX Guidelines", Dash Replenishment Service, XP055598411, Available online at URL:https://web.archive.org/web/20171208012109/https://developer.amazon.com/docs/das h/customer-experience-guidelines.html, Dec. 8, 2017, 9 pages.

"Dash Replenishment Service Glossary", Dash Replenishment Service, XP055598456, Available online at: URL:https://web.archive.org/web/201712080 1422/https://developer.amazon.com/docs/das h/glossary.html, Dec. 8, 2017, 6 pages.

"Frequently Asked Questions", Dash Replenishment Service, XP055598417, Available online at URL:https://web.archive.org/web/20171208012934/https://developer.amazon.com/docs/das h/faqs.html, Dec. 8, 2017, 5 pages.

"GetOrderInfo Endpoint", Dash Replenishment Service, XP055598458, Available online at URL:https://web.archive.org/web/20171208041609/https://developer.amazon.com/docs/das h/getorderinfo-endpoint.html, Dec. 8, 2017, 6 pages.

"Notification Messages (DRS)", Dash Replenishment Service, XP055598457, Available online at URL:https://web.archive.org/web/20171208041525/https://developer.amazon.Gom/docs/das h/notification-messages.html, Dec. 8, 2017, 14 pages.

"SlotStatus Endpoint", Dash Replenishment Service, XP055598461, Available online.atURL:https://web.archive.org/web/20171208041548/https://developer.amazon.com/docs/das h/slotstatus-endpoint.html, Dec. 8, 2017, 7 pages.

PCT/US2019/022226 , "International Search Report and Written Opinion", dated Jul. 2, 2019, 14 pages.

U.S. Appl. No. 15/918,205, titled "Managing Shipments Based on Data From a Sensor-Based Automatic Replenishment Device," filed Mar. 12, 2018.

U.S. Appl. No. 15/926,779, titled "Product Specific Correction For a Sensor-Based Device," filed Mar. 20, 2018.

U.S. Appl. No. 15/927,324, titled "Managing Electronic Requests Associated With Items Stored by Automatic Replenishment Devices," filed Mar. 21, 2018.

U.S. Appl. No. 15/927,946, titled "Automatic Replenishment of Items Utilizing a Sensor-Based Device," filed Mar. 21, 2018.

U.S. Appl. No. 15/927,990, titled "Order Quantity and Product Recommendations Based on Sensor Data," filed Mar. 21, 2018.

U.S. Appl. No. 15/927,998, titled "Predictive Consolidation System Based on Sensor Data," filed Mar. 21, 2018.

U.S. Appl. No. 15/928,409, titled "LED Enhanced Product and Lid Identification for Sensor-Based Device," filed Mar. 22, 2018.

U.S. Appl. No. 15/934,780, titled "Test-Enabled Measurements for a Sensor-Based Device," filed Mar. 23, 2018.

U.S. Appl. No. 15/963,761, titled "Sensor-Related Improvements to Automatic Replenishment Devices," filed Apr. 26, 2018.

Griffiths, "Never Run Out of Food Again! Smart Mat Warns You When You're Low on Milk While Fridge Cam Lets you Remotely Check What you Already Have During your Weekly Shop," Available online at http://www.dailymail.co.uk/sciencetech/article-3385278/Never-run-food-Smart-mat-tells-low-milk-fridge-cam-shows-s-inside-shopping.html, Jan. 5, 2016, 8 pages.

U.S. Appl. No. 15/696,040, titled "Sensor Data-Based Reordering of Items," filed Sep. 5, 2017.

"Amazon Dash Replacement for Developers", Youtube, Available Online at: https://www.youtube.com/watch?v=WS42WcuSyVU, Jan. 30, 2017, 4 pages.

Li et al., "Discussion of Principle and Application for Internet of Things", Applied Mechanics and Materials, vol. 347-350, 2013, pp. 3322-3325.

Welch et al., "Seven Keys to ERP Success", Strategic Finance, vol. 89, No. 3, Institute of Management Accountants, Sep. 2007, pp. 41-61.

PCT/US2019/022215 , "International Search Report and Written Opinion", dated Apr. 29, 2019, 11 pages.

* cited by examiner

PRODUCT AND LID IDENTIFICATION FOR SENSOR-BASED DEVICE

BACKGROUND

Online retailers as well as brick and mortar retailers offer subscription services that deliver items to users on a periodic basis. However, services such as subscriptions can deliver items even when an amount of the item is remaining resulting in a build-up of the item in a user's home or work place. Further, static subscription and delivery services fail to account for varied use of the item by the user. For example, a user may utilize an unusual amount of an item (e.g., more than they usually do) and be left to either wait for the next delivery or to visit a retailer to resupply the item. Interacting with user interfaces or visiting web sites of retailers to modify a subscription can be time consuming and confusing resulting in the user either receiving too much of an item or be left with not enough of the item in between deliveries. In addition, users may forget which items are stored in which containers when conventional labeling or container identifiers are not available or feasible. A user may contaminate a container by storing one item in the container until the item is exhausted and the storing another item in the same container (e.g., storing sugar in a container until it is exhausted and then storing salt in the same container). Manually labeling such containers may result in out of date identifications which may be removed as a result of a cleaning process or are hard to remove and thus reassociate with a new item.

BRIEF DESCRIPTION OF THE DRAWINGS

Various embodiments in accordance with the present disclosure will be described with reference to the drawings, in which.

DETAILED DESCRIPTION

Figure 1:
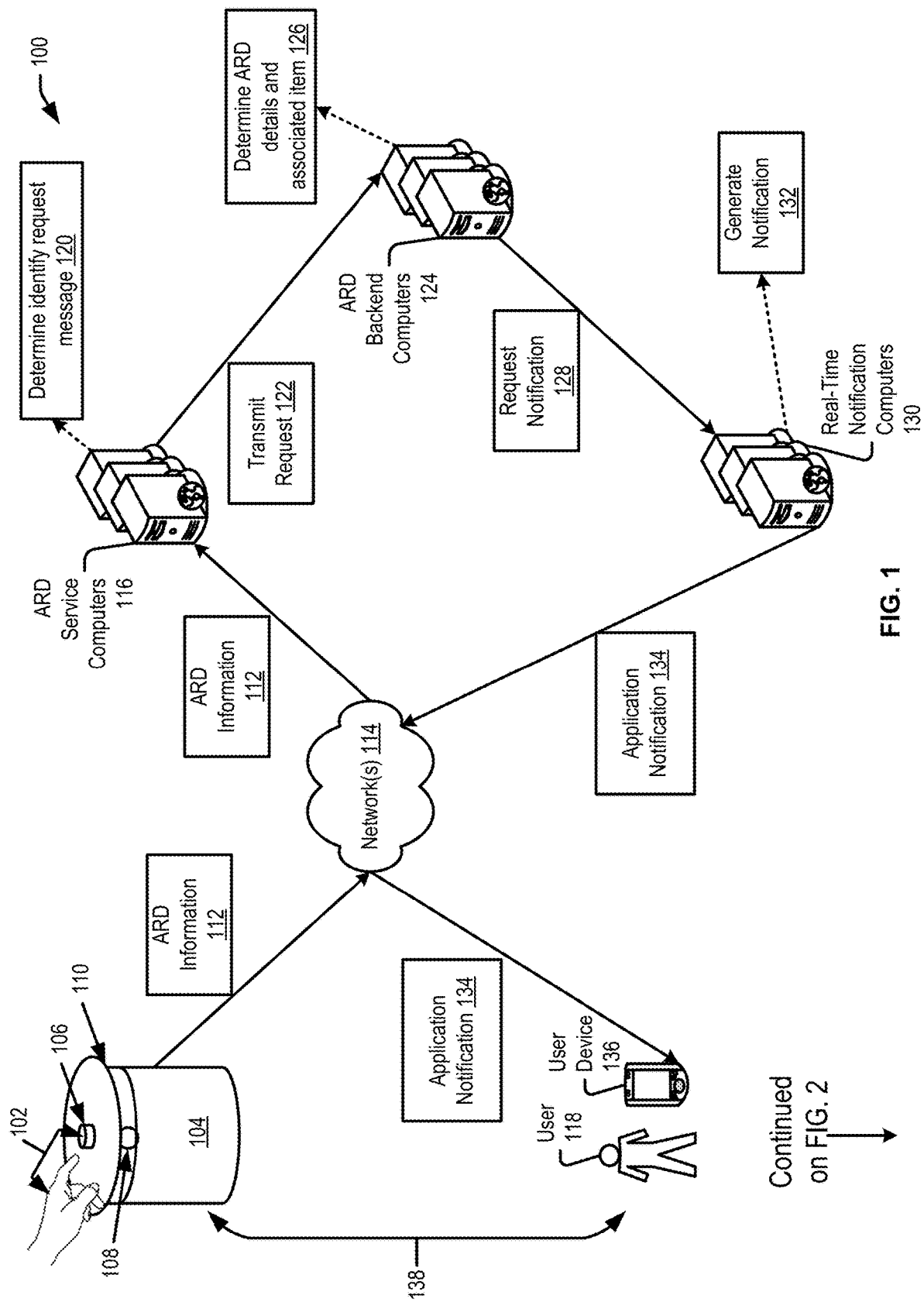
FIG. 1 illustrates a workflow for a sensor based device identification feature that includes one or more service provider computers, an automatic replenishment device (ARD), and a user device, in accordance with at least one embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described herein provide for a sensor based device identification feature for utilizing an interaction by a user with an automatic replenishment device (ARD) to identify an item associated with the ARD. In embodiments, a user may interact with a component of an ARD, such as by pressing a button, to generate and transmit, via available networks such as the Internet, an identify request from the ARD to a service provider computer (service provider computers) implementing the sensor based device identification feature. The service provider computer may map a device identifier of the ARD and a registration token of the user to determine an item associated with or stored by the ARD. A notification may be generated and transmitted by the service provider computer to a user device of a user associated with the ARD. In embodiments, the notification may identify the item associated with the ARD that corresponds to the ARD the user interacted with by pressing the button of the ARD. In accordance with at least one embodiment, the user may interact, via a user device, with the notification to be presented with an ARD user interface. In embodiments, the ARD user interface may be presented via an associated mobile application, a web browser, or other native application of a user device. The ARD user interface may include information about the ARD, the associated item, as well as be configured to enable the user to update one or more settings of the ARD such as renaming the ARD, associating a new item with the ARD, or updating an automatic re-order threshold of the ARD for the item stored by the ARD. By interacting with the notification a user may bypass navigating multiple windows or having to login to a session of an application or a web browser to the ARD user interface for the particular ARD that they are interested in (e.g., corresponding to the identify request).

The ARD may be a pad, mat, or shelf in which items (e.g., office supplies, toiletries, dog food, or consumable and/or fungible items generally) are placed on a surface of the ARD, or a container in which the items are placed within the container. A sensor (e.g., a weight sensor) of the ARD may be placed within or on a surface of the ARD and be configured to periodically obtain weight measurements or property measurements (e.g., weight, volume, mass, etc.) of the items that are placed on the surface of the ARD. The weight measurements decreasing over time or the property measurements changing over time may indicate an extent to which a user is removing the items from the ARD and using/consuming the items. In some embodiments, the ARD may be a container with a sensor located on an interior surface of the container in which items are placed within the container. A sensor (e.g., time of flight sensor) of the ARD may be configured to periodically obtain distance measurements (or property measurements including any electronic signal technology that can determine an elapsed time period between transmission of a signal from a source and a return of the signal) from the sensor to an item stored within the container. The distance measurements increasing over time may indicate an extent to which a user is removing the items from the ARD and using/consuming the items. In some embodiments, the sensor of the ARD may be configured to obtain property measurements upon a user interacting with the ARD, such as when a user removes or places an item on or in the ARD, or when a user interacts with the ARD such as by removing a lid of an ARD container and placing the lid back on the ARD container.

The sensor data obtained by the sensor(s) (e.g., weight measurements, distance measurements, or property measurements) of the ARD may be communicated via an available network (e.g., the Internet) such as a WiFi network or cellular network to service provider computers (service provider computer) that analyze the sensor data to determine consumption data. In embodiments, the service provider computer may be configured to utilize the raw sensor data obtained by the sensor(s) of the ARD to determine a consumption rate or consumption data of an item associated with an ARD. In accordance with at least one embodiment, the consumption data for an item and a user may be maintained in a corresponding user profile for the user and analyzed to determine a consumption rate for the item associated with the ARD.

In embodiments, each ARD and the components of the ARD are associated with a specific product during an initialization or registration process with the ARD and the user. Users that utilize multiple ARDs may need to identify which ARD they are interacting with to resupply more of the item after, for example, cleaning the ARD (e.g., interacting with the ARD after the item that was previously stored with the ARD is exhausted). In embodiments where the sensors of an ARD are located in a lid of a container ARD, the appropriate lid must be associated with the correct container so that the corresponding re-order threshold and consumption data may be obtained for the appropriate product or item.

In accordance with at least one embodiment, the service provider computer may determine a reorder threshold associated with an item. The reorder threshold may be based on the item itself (e.g., expiration dates), consumption patterns of the user (e.g., based on the consumption data obtained by the sensors of the ARD), consumption patterns of other users (e.g., based on the consumption data obtained by sensors of aggregate ARDs), or specified by the user themselves. Instead of a user having to remember to reorder an item when the amount of the item or supply of the item is low or exhausted, the service provider computers may utilize the consumption data and reorder threshold to automatically reorder the item for delivery. For example, when the consumption data determined from the weight data obtained by the sensor(s) of the ARD is equal to or below the reorder threshold, the item may be ordered and delivered to a user. By utilizing the consumption data in this fashion, the system can dynamically adjust the automatic reorder of the item resulting in the user receiving additional inventory of the item prior to the user's supply of the item being depleted. In some embodiments, when the consumption data determined from the distance measurement data obtained by the sensor(s) of an ARD indicates that a current level of the item in the container ARD is equal to or below the reorder threshold, the service provider computers may automatically reorder and deliver additional inventory for the item to a location associated with the user (e.g., a home or workspace).

In accordance with at least one embodiment, an ARD may be associated with one or more output components or devices that are configured to activate or otherwise communicate with a user in response to receiving a signal from the service provider computer. For example, an ARD may include one or more light emitting diode (LED) components or other visual spectrum emitting components. A user may, during an initialization or registration procedure, map a particular color of the LED components to represent a particular ARD and item pairing (e.g., the red light emitting ARD is associated with coffee). In accordance with at least one embodiment, the service provider computer may determine a corresponding signal and output component to utilize to enable a user to identify the ARD-to-item pairing based on the device capabilities (e.g., associated output components) rather than having the output signal correspond to a predetermined or defined output component of the ARD. For example, a device identifier provided by the ARD during an identify request may be used to map or look up the ARD capabilities which include corresponding output devices. In embodiments where multiple ARD identify requests are received the service provider computer can utilize the ARD capabilities or corresponding output devices to determine in real time which corresponding signal should be provided with the notification that informs the user which ARD is associated with what item, and which signal or output component activation correspond to the ARD-to-item pairing included in the notification or application notification. The identify request and identify answer techniques of the sensor based device identification feature may include modifying the notification to indicate which output component corresponds to an ARD to item pairing as well as generating a signal that activates the corresponding output component of the ARD. In embodiments, a user may interact with the notification to be directed to the ARD user interface where they may update the output component they want associated with the ARD to item pairing or interact with multiple identify requests and answers provided by the service provider computer.

The processes and systems described herein may be an improvement on conventional ARD to item identification methods. For example, conventional identification methods may include manually marking or otherwise denoting which item is associated with which ARD. However, such markings or denotations may be removed during a cleaning process, misinterpreted, and are not easily updated. In addition, conventional systems provide inefficient methods and processes for accessing user interfaces or data objects that are utilized to update the ARD to item pairing in a digital environment. For example, a user may have to remember usernames and passwords for a login session as well as navigate through multiple windows or interfaces before reaching the intended user interface for the appropriate ARD. In conventional systems a user may associate an item with an ARD unintentionally or incorrectly which may cause the resultant sensor data and re-order threshold for the intended item to be misapplied. The methods and systems described herein provide for more efficient identification of ARD to item pairing as well as updating or interacting with the ARD via a corresponding ARD user interface. As described herein, the sensor based device identification feature may utilize information provided by the ARD to map an item to ARD pairing that can be efficiently communicated to the user via a notification. Further, the notification may be interacted with by the user to bypass navigating multiple user interfaces and instead by directed to the relevant ARD user interface so that the user may update features of the ARD, provide a new item mapping, or perform other functions as described herein. The systems and methods described herein include embodiments where the ARD transmits the identification request to a service provider computer via available networks when a user interacts with the ARD thereby reducing the load and stress on the components of the ARD and utilizing less power. Less power usage can result in ARD manufacturing that uses less expensive components thereby reducing the cost to the manufacturer and the consumer.

FIG. 1 illustrates a workflow for a sensor based device identification feature that includes one or more service provider computers, an automatic replenishment device (ARD), and a user device, in accordance with at least one embodiment. The workflow 100 of FIG. 1 includes a user interacting 102 with an ARD 104. As depicted in FIG. 1, the interaction 102 may include a user pressing a button 106 of the ARD 104. Although FIG. 1 includes a representation of a button 106 as a component of the ARD 104 as an interaction 102 it should be noted that embodiments disclosed herein include other interactions between a user and the ARD 104. For example, the ARD 104 may be configured to utilize audio components to respond to voice commands from a user as well as visual components (e.g., one or more cameras or motion detection sensors) to respond to gesture commands. In some embodiments, the ARD 104 may be configured to utilize touch sensitive sensors or touch responsive surfaces that respond to a user tapping or otherwise touching the ARD 104 to activate an identify request or the ARD 104 is associated with an accelerometer that triggers the identify request upon a user shaking or otherwise moving the ARD 104. The ARD 104 may include a sensor 108 and a lid 110. The sensor 108 may be a time of flight sensor that is configured to determine a distance from the sensor 108 to a surface area of an item stored within the ARD 104. The ARD 104 of FIG. 1 represents a container ARD that includes sensor 108 that is located or mounted in or on an interior surface of the ARD 104 or on the lid 110. Although FIG. 1 depicts a user interacting with a single ARD (ARD 104), it should be noted that a user may interact with multiple ARDs to request an identity of each ARD with the sensor based device identification feature described herein.

In response to the interaction 102 with the ARD 104, ARD information 112 may be generated and transmitted, via available networks 114, to ARD service computers 116. In embodiments, the ARD information 112 may include an ARD device identifier that corresponds to ARD 104 and a registration token that represents the mapping or initialization of the user 118 with the ARD 104 during a registration or initialization process. In some embodiments, the ARD information 112 may include an item ID or an item tag ID. The ARD 104 may include communication components, such as WiFi component, for transmitting the ARD information 112, via networks 116, to the ARD service computers 116. In accordance with at least one embodiment, the ARD 104 may be configured to utilize a particular API that is associated with an identify request from an ARD as opposed to other identify requests or other messages processed by ARD service computers 116. In the workflow 100 the ARD service computers 116 may be configured to determine that the ARD information 112 received from ARD 104 is associated with an identify request message at 120. In embodiments, the ARD service computers 116 may determine that the ARD information 112 is associated with an identify request message 120 based on the data included in the ARD information 112 (e.g., the ARD device identifier, registration token) and/or based on the API utilized by the ARD 104 to transmit the ARD information 112 to the ARD service computers 116.

In the workflow 100, once the identify request message 120 has been determined, the ARD service computers 116 may transmit the request 122 to ARD backend computers 124. The ARD backend computers 124 may be configured to determine ARD details (ARD data) and associated item information at 126. In accordance with at least one embodiment, the ARD backend computers 124 may be configured to maintain a mapping of ARD device identifiers to paired items for one or more ARDs. The ARD backend computers 124 may perform a look up operation or a mapping function to identify the ARD device identifier included in the ARD information 112 to determine the ARD details and associated item at 126. In the workflow 100, upon determining the ARD details and associated item at 126, the ARD backend computers 124 may request that a notification be generated 128 by the real-time notification computers 130.

In embodiments, the real-time notification computers 130 may be configured to utilize the ARD details and associated item information 126 to generate a notification at 132 that identifies details about the ARD 104, as well as the item or product paired to the ARD 104 for identification purposes. The real-time notification computers may be configured to transmit the application notification 134, via available networks 114, to user device 136 that is associated with user 118. As depicted in FIG. 1, the user 118 is associated 138 with the ARD 104. As described herein, the application notification 134 may indicate which item is associated with ARD 104 in response to the interaction 102 by the user 118 with the ARD 104 component 106. The application notification 134 may include other information such as details about the ARD 104 including when a last measurement of the item was obtained by sensors 108, what the automatic re-order threshold is for the ARD 104 and corresponding item, a name for the ARD 104, as well as other information. The application notification 134 may be generated and transmitted by the real-time notification computers 130 to be utilized by a mobile application, a native application, a web browser, an email, or a short message service (SMS) text of the user device 136. The user 118 may specify how they would like to receive application notifications 134 when providing identify requests for associated ARDs. It should be noted that although FIG. 1 includes multiple computers (116, 124, and 130) communicating the implement the sensor based device identification feature, a single service provider computer may implement similar embodiments. Further, the computers 116, 124, and 130 are all examples of service provider computers. The user 118 interacting with the application notification 134 via user device 136 is explained with reference to FIG. 2 below.

Figure 2:
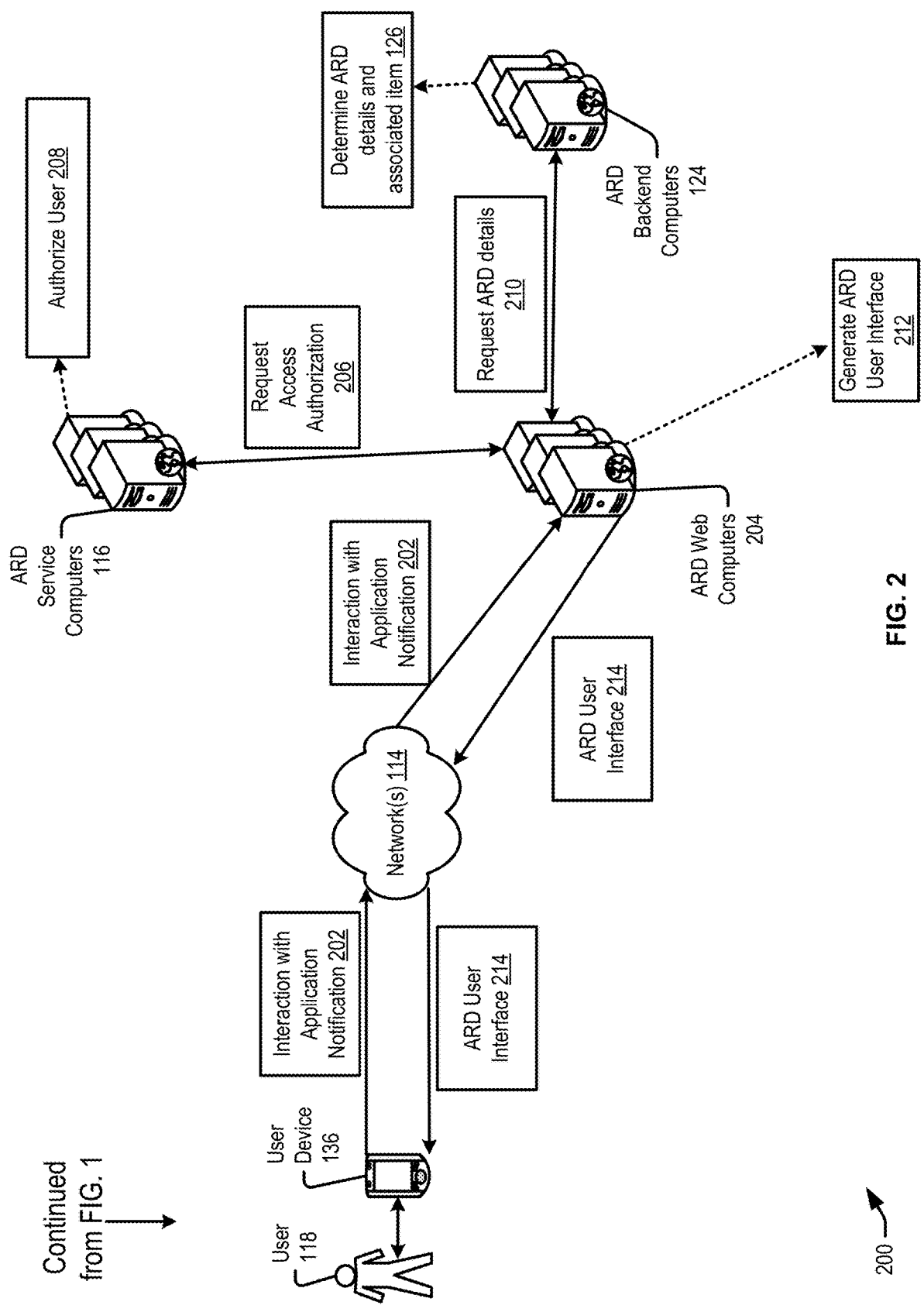
FIG. 2 illustrates a workflow for a sensor based device identification feature that includes one or more service provider computers, an ARD, and a user device, in accordance with at least one embodiment.

FIG. 2 illustrates a workflow for a sensor based device identification feature that includes one or more service provider computers, an ARD, and a user device, in accordance with at least one embodiment. The workflow 200 of FIG. 2 continues from the workflow 100 of FIG. 1. In the workflow 200 of FIG. 2, the user 118 may interact with the application notification 134 via user device 136 to be directed to an ARD user interface. The workflow 200 of FIG. 2 depicts an indication of the interaction with the application notification 202 being transmitted from the user device 136, via networks 114, to ARD web computers 204. In embodiments, the ARD web computers 204 may utilize the interaction with the application notification 202 to request access authorization 206 from the ARD service computers 116. In embodiments, the registration token provided by the ARD 104 in the ARD information 112 may be utilized along with login session information of the user device 136 to authorize the user at 208 of workflow 200 by the ARD service computers 116. For example, an existing login session with login credentials may be transmitted from the user device 136, via networks 114, to ARD web computers 204 and ARD service computers 116. The login credentials along with the ARD information 112 may be used to authorize the user 208 to gain access to the specific ARD user interface associated with ARD 104 of FIG. 1.

In response to the user being authorized at 208, the ARD web computers 204 may request ARD details (ARD data) 210 from the ARD backend computers 124. In accordance with at least one embodiment, the ARD backend computers 124 may determine the ARD details and associated item information at 126 by performing a mapping of the ARD device identifier for ARD 104 to a paired item. The ARD backend computers 124 may perform a look up operation or a mapping function to identify the ARD device identifier included in the ARD information 112 to determine the ARD details and associated item at 126. In the workflow 200, the ARD web computers 204 may use the requested ARD details 210 to generate an ARD user interface 212. The ARD user interface 212 may include information about the ARD 104, an associated or paired item, as well as be configured to enable the user 118 to interact with the ARD user interface 214 to update information, details, or mappings of the ARD 104 as explained in more detail with reference to FIG. 3. The workflow 200 may include the ARD web computers 204 transmitting the generated ARD user interface 214, via networks 114, to the user device 136. The ARD user interface 214 may be configured to be presented to the user 118, via user device 136, using a mobile application, a web browser, or a native application of the user device 136. As noted with FIG. 1, it should be appreciated that although the workflow 200 of FIG. 2 represents the computers 204, 116, and 124 generating a single ARD user interface 214 in response to the interaction with the application notification 202, that embodiments disclosed herein include embodiments where multiple or a plurality of ARD user interfaces are generated and transmitted to multiple user devices associated with the user 118 or to multiple user devices of multiple users interacting with application notifications such as application notification 134 of FIG. 1.

Figure 3:
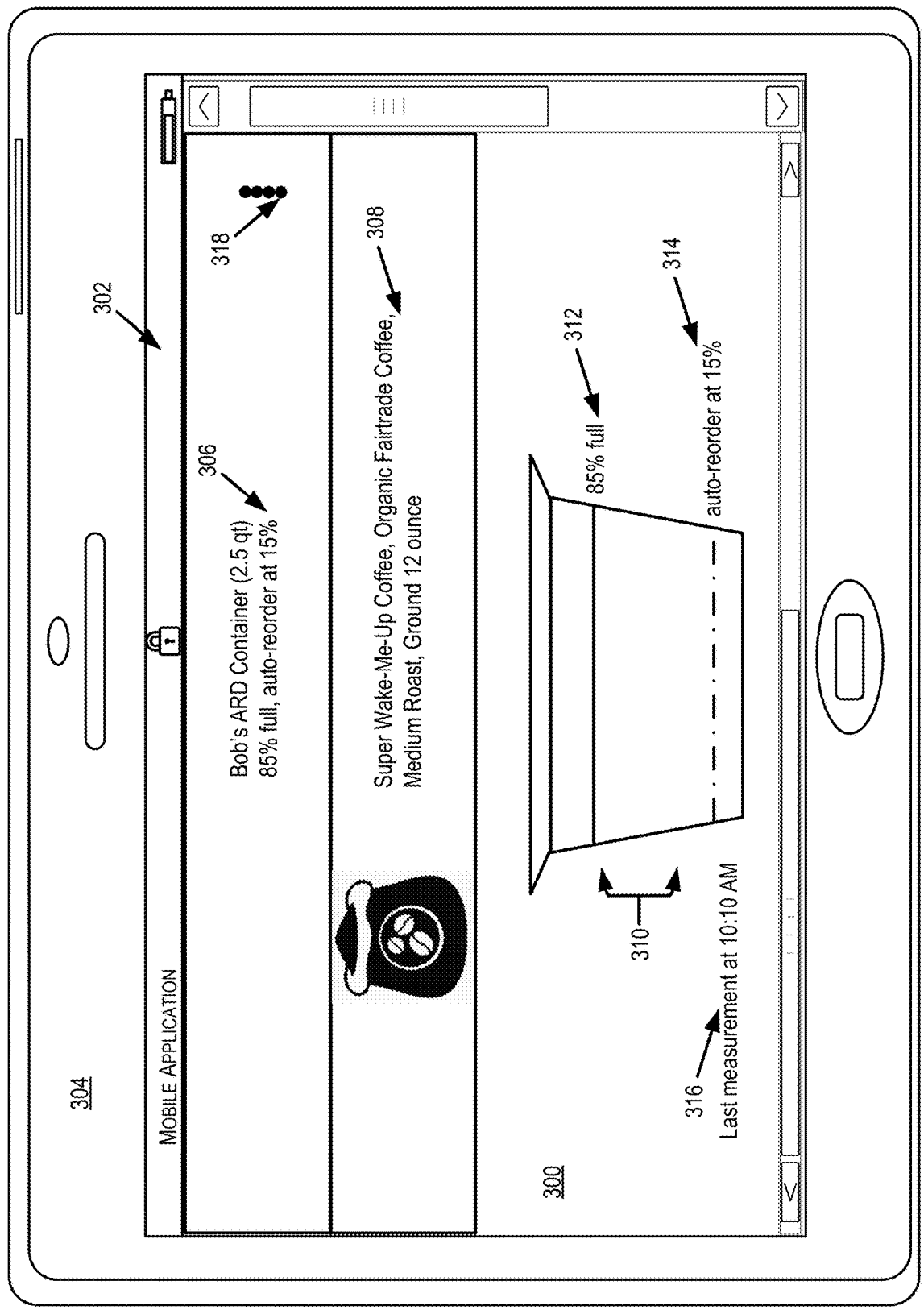
FIG. 3 illustrates an example user interface for a sensor based device identification feature, in accordance with at least one embodiment.

FIG. 3 illustrates an example user interface for a sensor based device identification feature, in accordance with at least one embodiment. FIG. 3 depicts an example ARD user interface 300 displayed via a mobile application 304 of a mobile device 304. The ARD user interface 300 may include information about the ARD, such as a name for the ARD as well as a size for the ARD at 306. The ARD user interface 300 may display or present information about the item 308 associated with the ARD 306 which may include alphanumeric character descriptors of the item as well as images for the item. The ARD user interface 300 may include a graphical representation of the ARD 306 at 310. The graphical representation of the ARD 306 at 310 may include a graphical representation of a current item level at 312 as well as a graphical representation of an auto-reorder threshold for the item at 314.

The current item level at 312 and the auto-reorder threshold for the item at 314 are determined based on data obtained by sensors of the ARD as described in U.S. patent application Ser. No. 15/696,040 filed Sep. 5, 2017 entitled "SENSOR DATA-BASED REORDERING OF ITEMS' of which the full disclosure is incorporated herein by reference. In accordance with at least one embodiment, the ARD user interface 300 may include information about when a last measurement was obtained 316 that identifies when a last measurement was obtained by the sensors of the ARD which the graphic representation of the ARD 310 and current item level 312 and auto-reorder threshold 314 are derived from. A user may interact with the ARD user interface by interacting with data object or user interface element 318 to rename the ARD at 306, update the auto-reorder threshold at 314, associate a new item (not item 308) with the ARD 306, indicate other preferences for receiving notifications about the item 308 and ARD 306, or disassociate the ARD 306 from themselves. In embodiments, the ARD user interface 300 may include other features or data points such as a sensor measurement history or timeline that indicates a history of measurements obtained by corresponding sensors for item 308 and ARD 306. The sensor measurement history may identify a time period of when the data was captured and the determined item level at the time period based on the sensor data. Additional information for the ARD user interface 300 may be included such as an expiration date for the item 306 as well as a current price for the item 306. In accordance with at least one embodiment, the ARD user interface 300 may present the features or information about the ARD 306 and item 308 for a time period that corresponds to an initial pairing of the item 308 and ARD 306 (e.g., the sensor measurement history may include measurements obtained from when the item 308 and ARD 306 were initially paired to a current time period). In some embodiments, a user can specify or configure the sensor measurement history for the ARD 306 and item 308 to depict a time period or information and features that are presented in the ARD user interface 300.

Figure 4:
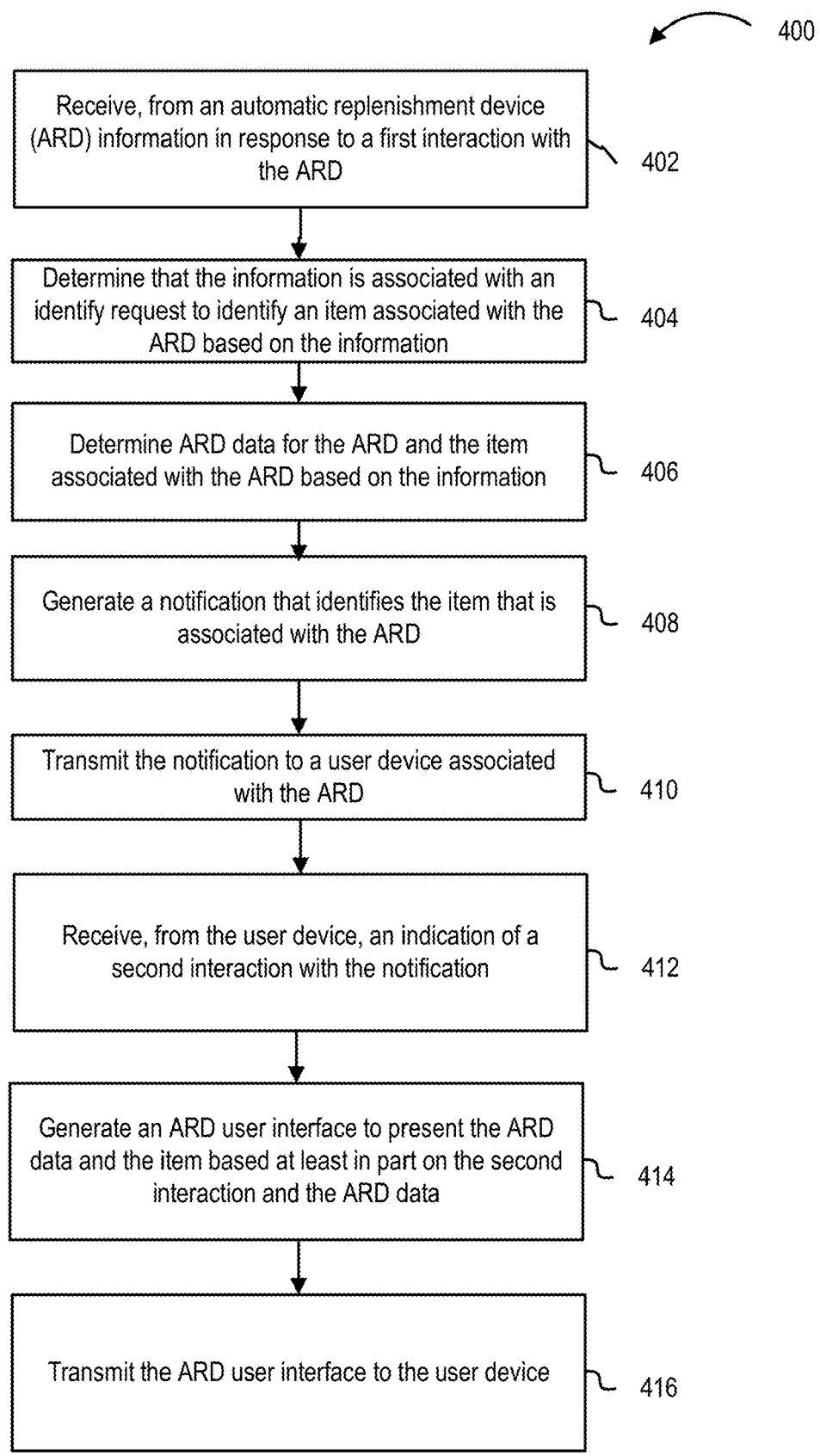
FIG. 4 illustrates a flow diagram of a process for a sensor based device identification feature, in accordance with at least one embodiment.
Figure 5:
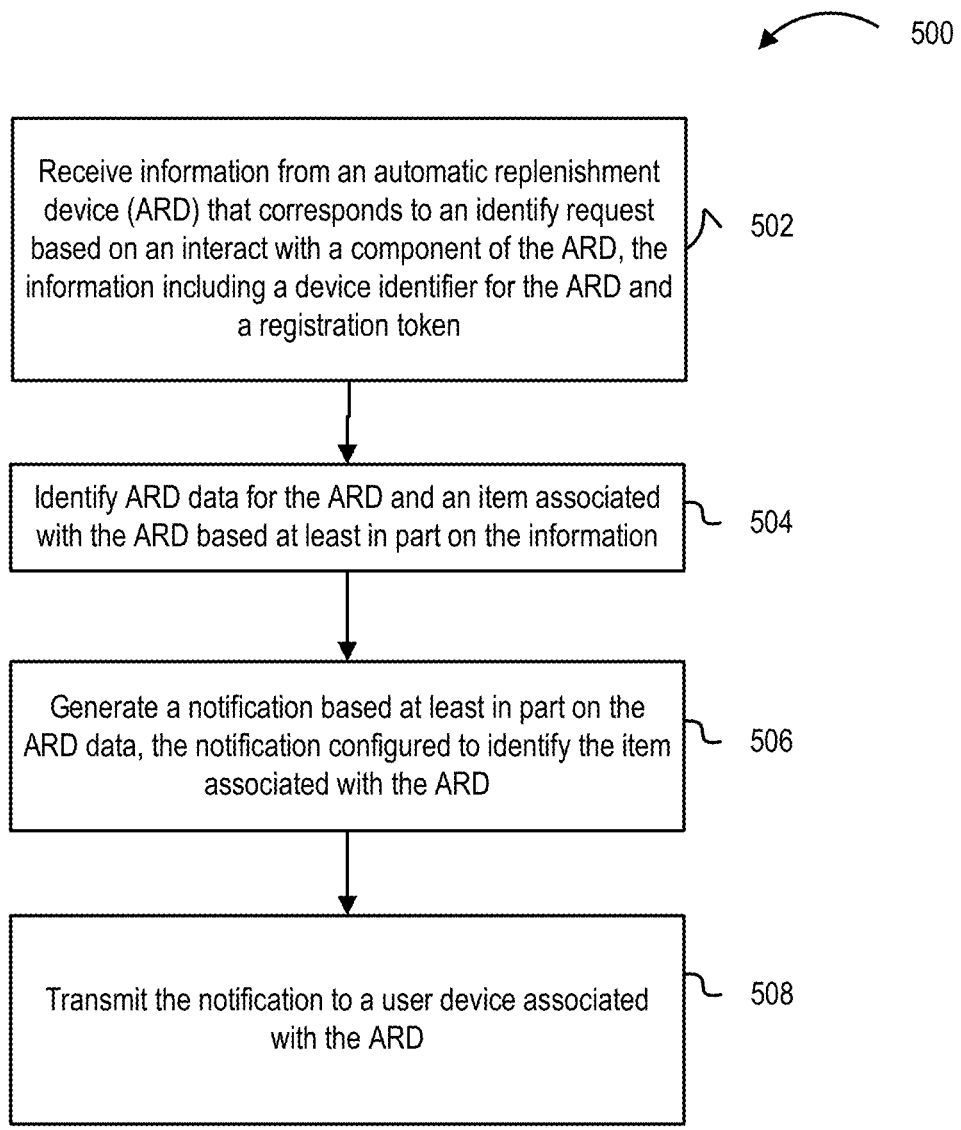
FIG. 5 illustrates a flow diagram of a process for a sensor based device identification feature, in accordance with at least one embodiment.

FIGS. 4 and 5 illustrate example flows for a sensor based device identification feature, according to embodiments. These processes are illustrated as a logical flow diagram, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer executable instructions include routines, programs, objects, components, data structures and the like that perform particular functions or implement particular data types. The order in which the operations are described is not intended to be construed as a limitation, and any number of the described operations can be combined in any order and/or in parallel to implement the processes.

Additionally, some, any, or all of the process (or any other processes described herein, or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. As noted above, the code may be stored on a computer-readable storage medium, for example, in the form of a computer program including a plurality of instructions executable by one or more processors. The computer-readable storage medium may be non-transitory.

In some examples, the one or more service provider computers 116, 124, 130, 204, 618, or 1414 (e.g., utilizing at least one of the device to item identification module 830, and ARDs 104, 306, 604, 1100, 1200, 1300, or 1432) shown in FIG. 1, 2, 6, 11, 12, 13, or 14 may perform the processes 400 and 500 of FIGS. 4 and 5. In FIG. 4 the process 400 may include receiving, from an ARD, information in response to a first interaction with the ARD at 402. For example, a user may interact with a component of the ARD such as a button, a receiver, a motion capture camera, etc., that initiates an identify request for the ARD to determine an item associated with the ARD. The process 400 may include determining that the information is associated with an identify request to identify an item associated with the ARD based at least in part on the information at 404. In some embodiments, the information may be communicated to the service provider computers utilizing a particular API call which signals an identify request. The process 400 may include determining ARD data for the ARD and the item associated with the ARD based at least in part on the information at 406. As described herein, the service provider computers may use the information transmitted from the ARD (e.g., an ARD identifier) to look up or map an associated user, user profile, item, and other information that is associated with the ARD.

The process 400 may include generating a notification that identifies the item that is associated with the ARD at 408. As illustrated in FIG. 3, the notification may be configured to be presented via a mobile application and identify an ARD to item pairing (e.g., which ARD of a user is associated with what item). The process 400 may include transmitting the notification to a user device associated with the ARD at 410. For example, the notification may be transmitted as a push application notification to a mobile application of a user device. The information maintained by the service provider computer may include contact information (e.g., email addresses, phone numbers, application IDs, etc.,) for transmitting the notification. The process 400 may include receiving, from the user device, an indication of a second interaction with the notification at 412. For example, a user may interact with the notification via an application of their user device. The process 400 may include generating an ARD user interface to present the ARD data and the associated item based at least in part on the second interaction and the ARD data at 414. The process 400 may conclude at 416 by transmitting the ARD user interface to the user device.

The process 500 may include receiving information from an ARD that corresponds to an identify request based at least in part on an interaction with the ARD at 502. In embodiments, the information may include a device identifier for the ARD and a registration token. The process 500 may include identifying ARD data for the ARD and an item associated with the ARD based at least in part on the information at 504. The process 500 may include generating a notification based at least in part on the ARD data, the notification configured to identify the item associated with the ARD at 506. In embodiments, a user may interact with the notification, via user device, to be directed to an ARD user interface that includes features for enabling the user to update a name of the ARD, associate a new item with the ARD, update the automatic re-order threshold, etc. The process 500 may conclude at 508 by transmitting the notification to a user device associated with the ARD.

Figure 6:
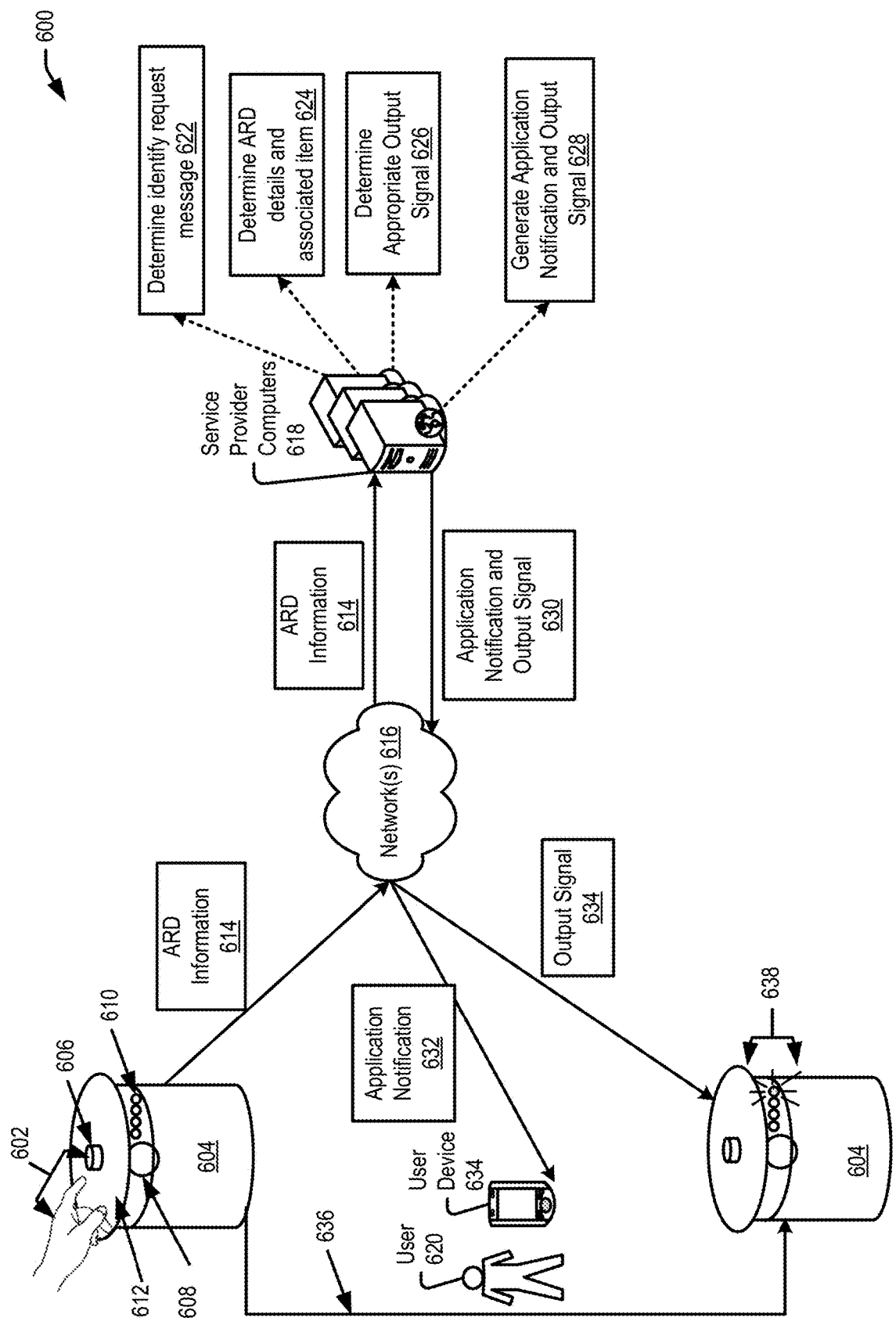
FIG. 6 illustrates a workflow for a sensor based device identification feature that includes service provider computers, an automatic replenishment device (ARD), and a user device, in accordance with at least one embodiment.

FIG. 6 illustrates a workflow for a sensor based device identification feature that includes service provider computers, an automatic replenishment device (ARD), and a user device, in accordance with at least one embodiment. The workflow 600 of FIG. 6 includes a user interacting 602 with an ARD 604 such as by pressing a button 606 of ARD 604. The ARD 604 of FIG. 6 may include a sensor 608, one or more output devices (output component(s)) 610, and a lid or container lid 612. In embodiments, the one or more output devices 610 may be light emitting components (such as different colored LED lights), or sound emitting components such as speakers. In response to the interaction 602 the ARD may be configured to transmit ARD information 614, via networks 616, to service provider computers 618. The service provider computers 618 may implement the sensor based device identification features disclosed herein. The sensor 608 may be a time of flight sensor that is configured to determine a distance from the sensor 608 to a surface area of an item stored within the ARD 604. The ARD 604 of FIG. 6 represents a container ARD that includes sensor 608 that is located or mounted in or on an interior surface of the ARD 604 or on the lid 612. Although FIG. 6 depicts a user interacting 602 with a single ARD (ARD 604), it should be noted that a user may interact with multiple ARDs to request an identity of each ARD with the sensor based device identification feature described herein.

In embodiments, the ARD information 614 may include an ARD device identifier that corresponds to ARD 604 and a registration token that represents the mapping or initialization of the user 620 with the ARD 604 during a registration or initialization process. In some embodiments, the ARD information 614 may include an item ID or an item tag ID. The ARD 604 may include communication components, such as WiFi component, for transmitting the ARD information 614, via networks 616, to the service provider computers 618. In accordance with at least one embodiment, the ARD 604 may be configured to utilize a particular API that is associated with an identify request from an ARD as opposed to other identify requests or other messages processed by the service provider computers 618. In accordance with at least one embodiment, the service provider computers 618 may determine that the ARD information 614 is received in response to an identify request message at 622. The service provider computers 618 may determine that the ARD information 614 received from ARD 604 is associated with an identify request message 622 based on the data included in the ARD information 614 (e.g., the ARD device identifier, registration token) and/or based on the API utilized by the ARD 604 to transmit the ARD information 614 to the service provider computers 618.

In workflow 600, once the identify request message 622 has been determined, the service provider computers 618 may determine ARD details and associated item information at 624. In accordance with at least one embodiment, the service provider computers 618 may be configured to maintain a mapping of ARD device identifiers to paired items for one or more ARDs. The service provider computers 618 may perform a look up operation or a mapping function to identify the ARD device identifier included in the ARD information 614 to determine the ARD details and associated item at 624. The service provider computers 618 may identify that the ARD in question (e.g., the ARD 604 providing the identify request 622) is associated with output devices 610. The workflow 600 includes the service provider computers 618 determining an appropriate output signal 626 to transmit to the output devices 610 to activate the output devices 610 based on the ARD information 614. For example, the information mapped to the ARD 604 may identify that the ARD 604 has four different colored LED lights.

In workflow 600, the service provider computers 618 may generate an application notification and output signal at 628. The service provider computers 618 may utilize the ARD details and associated item information at 624 to generate the notification and the determined output signal 626 to generate the output signal at 628. As described herein, the output signal at 628 may be configured to be transmitted to the ARD 604 to activate the output devices 610. In accordance with at least on embodiment, the application notification and output signal 630 may be transmitted, via networks 616, to the user device 634 and ARD 604. As illustrated in FIG. 6, the application notification 632 may be transmitted to user device 634 for presentation to the user 620 whereas arrow 636 represents the ARD 604 receiving the output signal 634 and activating the output devices at 638 (e.g., emitting a certain colored light). In embodiments, the application notification 632 may identify that a certain colored light or activation of a certain output device 610 of ARD 604 corresponds to an ARD 604 that is further associated with a particular item or product. For example, the application notification 632 may inform the user that the ARD with a flashing red light is associated with salt. As described with reference to FIG. 1, the user may interact with application notification 632 to be presented with an ARD user interface that corresponds to ARD 604, the associated item, and indicates the associated output device activation that self identifies the ARD 604 upon the user 620 interacting 602 with ARD 604. It should be appreciated that although FIG. 6 illustrates generating and providing an application notification 632 and an output signal 634 for a single interaction 602 by a user 620 with the ARD 604, embodiments disclosed herein are configured to receive and process multiple ARD identify requests in response to multiple ARD interactions by a user with multiple ARDs in a single location. Although FIG. 6 depicts the application notification 632 being provided to a user device 634 such as a mobile phone or tablet computer, embodiments of the sensor based device identification feature may include providing the application notification 632 to an Internet of Things (IoT) device with audio, video, and/or voice capabilities. For example, the IoT device may be configured to receive the application notification 632 and audibly inform the user 620 of the item paired with ARD 604 as well as the output signal 634. To further illustrate, an audio component of the IoT device may audibly inform the user 620 that the ARD that is emitting a certain colored light (638) is associated with super-wake-me-up coffee. In embodiments the application notification 632 may be configured to be utilized by a device, such as an IoT device, to present information corresponding to multiple ARD identify requests that identify each output component 610 corresponds to a particular item-to-ARD pairing.

Figure 7:
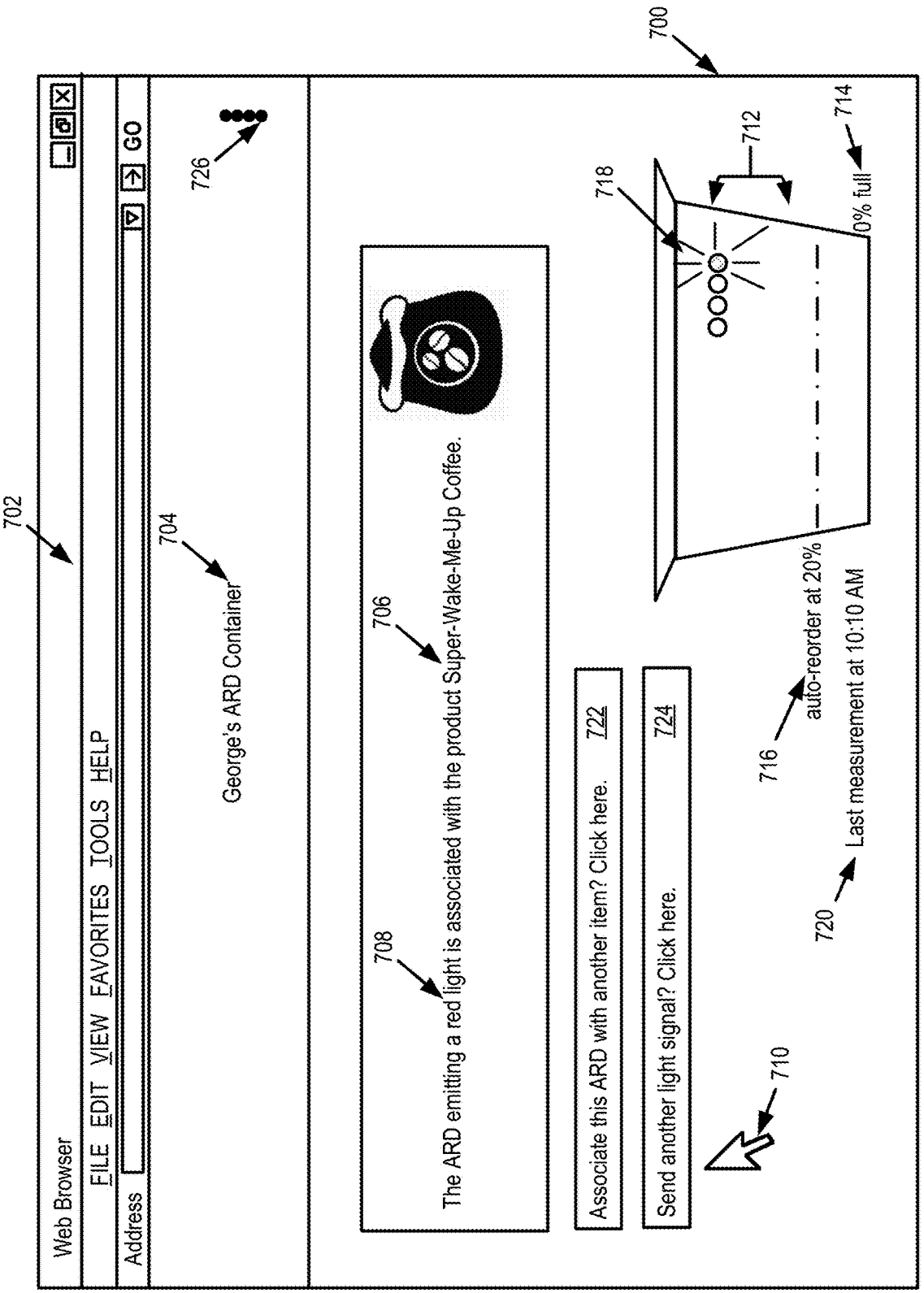
FIG. 7 illustrates an example user interface for a sensor based device identification feature, in accordance with at least one embodiment.

FIG. 7 illustrates an example user interface for a sensor based device identification feature, in accordance with at least one embodiment. The ARD user interface 700 of FIG. 7 is presented via a web browser 702 and includes an identifier 704 for an associated ARD (e.g., "George's ARD Container"). Similar to the ARD user interface of FIG. 3, the ARD user interface 700 may include a description of the item 706 associated with the ARD and indicate an activated output device 708 of the ARD to enable a user to identify the ARD to item pairing. The ARD user interface 700 may include other features or data elements that may be interacted with by the user for example by using an input/output device 710 of a user device such as a mouse. The ARD user interface 700 includes a graphical representation 712 of an ARD along with graphical representations of a current item level 714, an automatic-reorder threshold 716, and an activated output device 718 of the ARD associated with the identify request.

The graphical representation of the activated output device 718 of the ARD may match the actual signal and activation being emitted by the ARD. For example, the description at 708 that indicates the activated output device in FIG. 7 identifies that the ARD in question is "emitting a red light" and the activated output device 718 may also display a red color to match. The ARD user interface 700 may include information about when a last measurement was obtained for the ARD in question at 720. The ARD user interface 700 may include features or data elements to enable the user to associate the ARD with another item at 722 or to cause transmission of another signal by the service provider computer to activate the appropriate output device at 724. Other data elements or features such as element 726 may be configured to enable a user to rename the ARD in question or update the automatic-reorder threshold 716. In accordance with at least one embodiment, a user may browse or otherwise be interacting with an ARD user interface 700 for an ARD and be presented with an option to identify the ARD (e.g., identify the ARD to item pairing for the particular ARD). In such embodiments, the ARD user interface may be updated or modified to present information similar to that included in ARD user interface 700 such as a corresponding output signal 718 along with the item 706 and 708 that is associated with the ARD such as graphical representation of the ARD 712.

Figure 8:
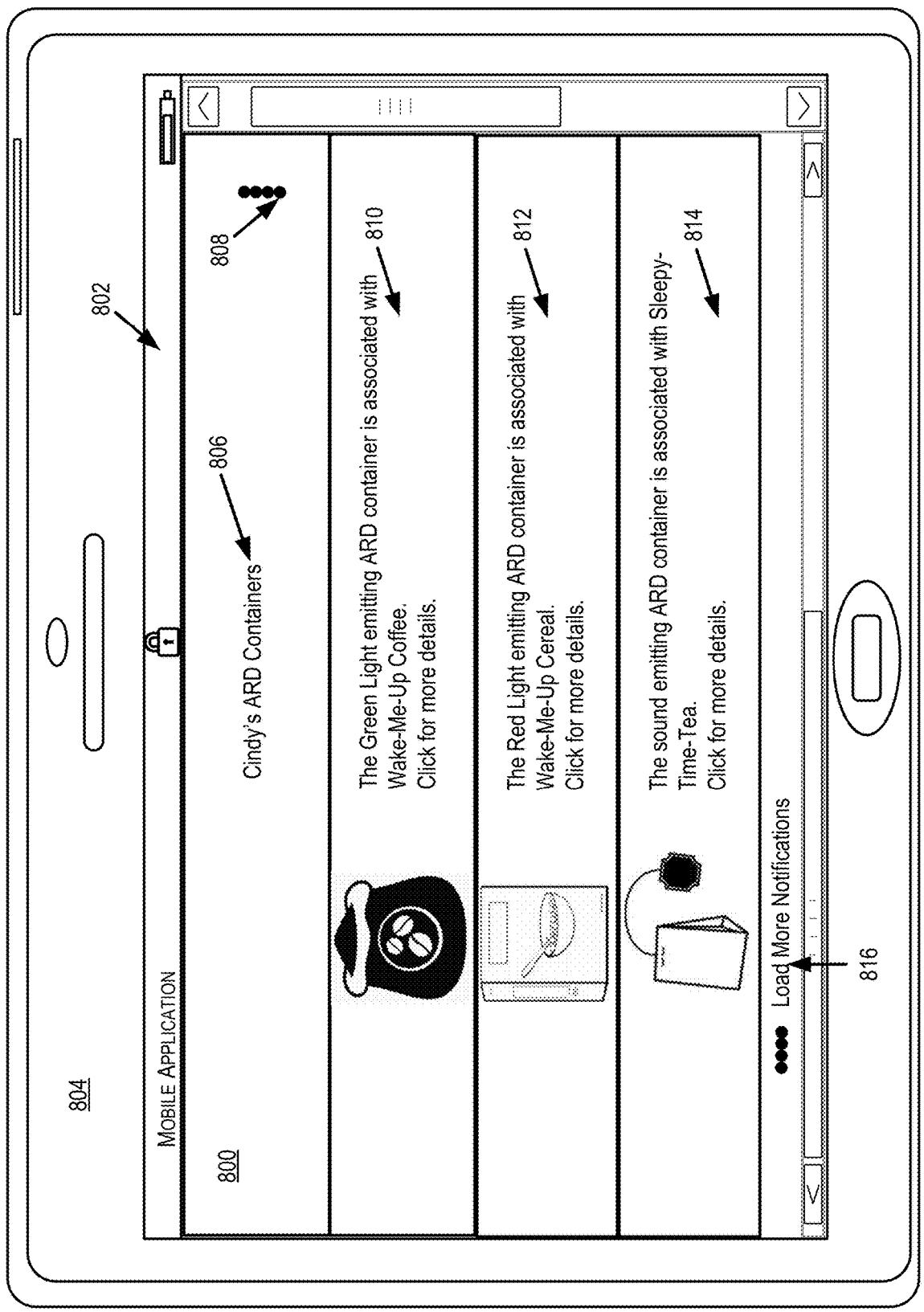
FIG. 8 illustrates an example user interface for a sensor based device identification feature, in accordance with at least one embodiment.

FIG. 8 illustrates an example user interface for a sensor based device identification feature, in accordance with at least one embodiment. The ARD user interface 800 of FIG. 8 is presented via a mobile application 802 of a user device 804 such as a tablet computer. The data elements of ARD user interface 800 include multiple notifications generated and transmitted to a user device in response to a user interacting with a plurality of ARDs to request an identity (ARD to item pairing) for each ARD. For example, a user may have four ARDs, each ARD storing a different item. Upon cleaning all four ARDs the user may wish to restock the ARDs but has no idea which item goes in which ARD. The user may push a button on each ARD to initiate an identify request as described in FIGS. 1, 2, and 6. The ARD user interface 800 includes a description of the user's ARDs at 806 as well as features or data elements 808 for updating ARD names, automatic-reorder thresholds, notification settings, etc.

The ARD user interface 800 displays notifications 810, 812, and 814 which correspond to three separate ARDs that each transmitted an identify request in response to an interaction by a user with each ARD. In embodiments, each ARD may include one or more output devices. The output devices associated with an ARD may be multiple of the same type of output device or a combination of output devices (e.g., multiple LED lights or a combination of an LED light and a speaker). The ARD user interface 800 includes notifications 810-814 displayed in an order that corresponds to the user interacting with each ARD. For example, the notification 810 corresponds to the first ARD that the user interacted with, the notification 812 corresponds to the second ARD the user interacted with, etc. As depicted in FIG. 8, each notification includes a description of a different output device to enable the user to easily identify which ARD corresponds to which output signal and item. For example, notification 810 indicates that the ARD emitting the green light is associated with "wake-me-up coffee," whereas the notification 814 indicates that the sound emitting ARD is associated with "sleepy-time-tea." As described with reference to FIG. 2, each notification may be interacted with by a user, via for example user device 804, to be directed to a more particularized ARD user interface for the ARD and item pairing in question. For example, a user may interact with notification 810 and be directed to an ARD specifically for the ARD storing the "wake-me-up coffee" similar to the ARD user interface of FIG. 7. The ARD user interface 800 also includes element 816 for loading more notifications that correspond to more identify requests made by the user. In embodiments, a user may interact with the ARD user interface 800 to dismiss the notifications 810-814 as well as cease the signal being transmitted by the service provider computer to each ARD in question. In accordance with at least one embodiment, the service provider computer may be configured to receive and process one ARD identify request within a certain time period rather than receiving and processing multiple ARD identify requests. For example, the service provider computer may be configured to receive and process an identify request within a certain time period or a number of ARD identify requests within the same time period. In embodiments, the service provider computer may generate and transmit a notification to inform the user that a certain ARD identify request of a plurality of ARD identify requests received has been processed thereby indicating that the user should interact with the unidentified ARDs to provide the identify requests again. In some embodiments, a user may interact with one notification at a time (e.g., 810, 812, and 814) prior to being presented with information from the other notifications.

Figure 9:
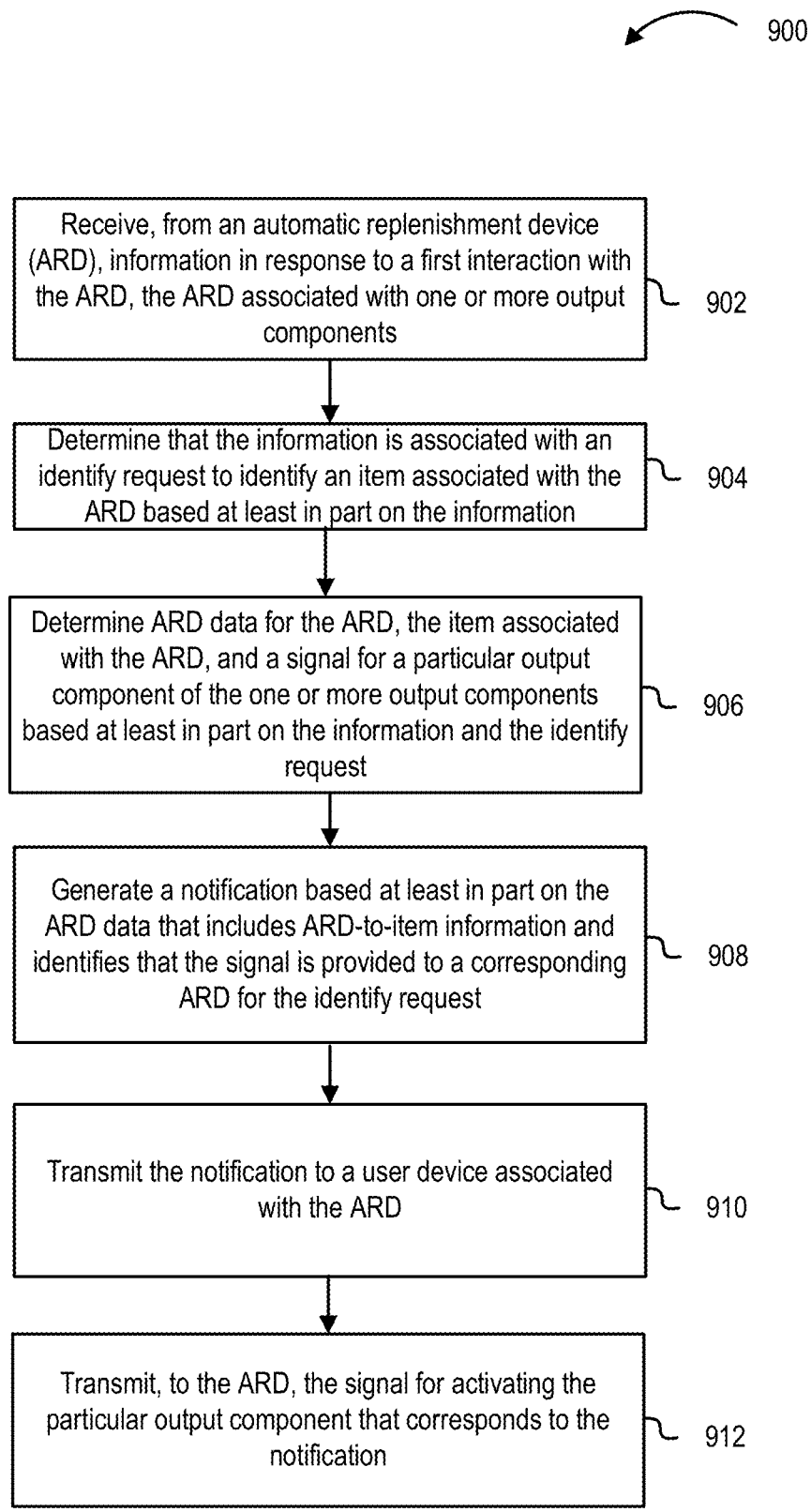
FIG. 9 illustrates a flow diagram of a process for a sensor based device identification feature, in accordance with at least one embodiment.
Figure 10:
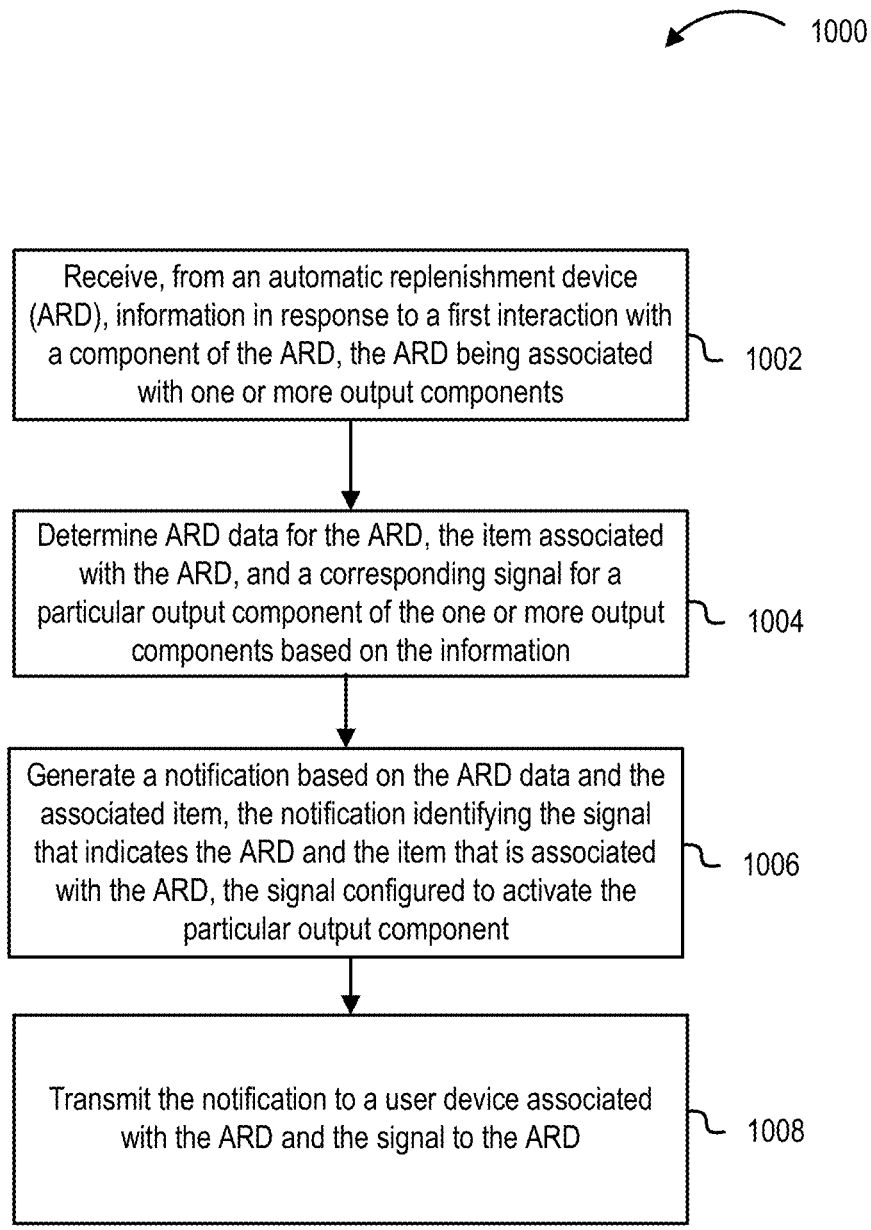
FIG. 10 illustrates a flow diagram of a process for a sensor based device identification feature, in accordance with at least one embodiment.

FIGS. 9 and 10 illustrate example flows for a sensor based device identification feature, according to embodiments. These processes are illustrated as a logical flow diagram, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer executable instructions include routines, programs, objects, components, data structures and the like that perform particular functions or implement particular data types. The order in which the operations are described is not intended to be construed as a limitation, and any number of the described operations can be combined in any order and/or in parallel to implement the processes.

Additionally, some, any, or all of the process (or any other processes described herein, or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. As noted above, the code may be stored on a computer-readable storage medium, for example, in the form of a computer program including a plurality of instructions executable by one or more processors. The computer-readable storage medium may be non-transitory.

In some examples, the one or more service provider computers 116, 124, 130, 204, 618, or 1414 (e.g., utilizing at least one of the device to item identification module 830, and ARDs 104, 306, 604, 1100, 1200, 1300, or 1432) shown in FIG. 1, 2, 6, 11, 12, 13, or 14 may perform the processes 900 and 1000 of FIGS. 9 and 10. In FIG. 9 the process 900 may include receiving, from an ARD, information in response to a first interaction with the ARD at 902. In embodiments, the ARD may be configured to utilize or be associated with one or more output components such as LED lights or speakers. The process 900 may include determining that the information is associated with an identify request to identify an item associated with the ARD based at least in part on the information at 904. The process 900 may include determining ARD data for the ARD, an associated item, and a signal for a particular output component of the one or more output components based at least in part on the information and the identify request at 906. For example, an ARD may be associated with multiple LED lights, each configured to emit a certain colored light. The service provider computer may determine or identify the appropriate colored light to activate with a signal based on the color designation set up during the ARD-to-item pairing when the user first associated the ARD to item. To further illustrate, during an initialization process a user may have assigned a particular ARD to coffee and a red light to help identify the ARD at a later time.

The process 900 may include generating a notification based at least in part on the ARD data that includes ARD-to-item information and identifies that the signal is provided to a corresponding ARD for the identify request at 908. For example, the notification may include information that indicates that the ARD with an activated output component (e.g., flashing a green light) corresponds to the ARD that is associated with chips and the identify request that the user previously initiated. The process 900 may include transmitting the notification to a user device associated with the ARD at 910. Similar to the notification described with reference to FIGS. 4 and 5, a user may interact with the notification, via the user device, to be directed to an ARD user interface for the ARD in question (e.g., the ARD associated with the identify request). The process 900 may conclude at 912 by transmitting, to the ARD, the signal for activating the particular output component that corresponds to the notification. For example, of the four colored LED lights, the signal may be configured to activate the red LED light to correspond to the notification which identifies the red light flashing or blinking to enable the user to more easily identify which ARD is associated with which item. In embodiments, the output component may be configured to activate for a certain amount of time after receiving the signal from the service provider computers or until a user interacts with the ARD or output component.

The process 1000 may include receiving, from an ARD, information in response to a first interaction with a component of the ARD at 1002. The ARD may be configured to utilize or be associated with one or more output components. The output components may be a combination of devices such as LED lights and speakers. The process 1000 may include determining ARD data for the ARD, the item associated with the ARD, and a corresponding signal for a particular output component of the one or more output components based at least in part on the information at 1004. The process 1000 may include generating a notification based at least in part on the ARD data and the associated item, the notification also identifying a signal that indicates the ARD and the item that is associated with the ARD in the notification at 1006. In embodiments, the signal may be configured to activate the particular output component upon being received by the corresponding ARD. The process 1000 may conclude at 1008 by transmitting the notification to a user device associated with the ARD and the signal to the ARD.

Figure 11:
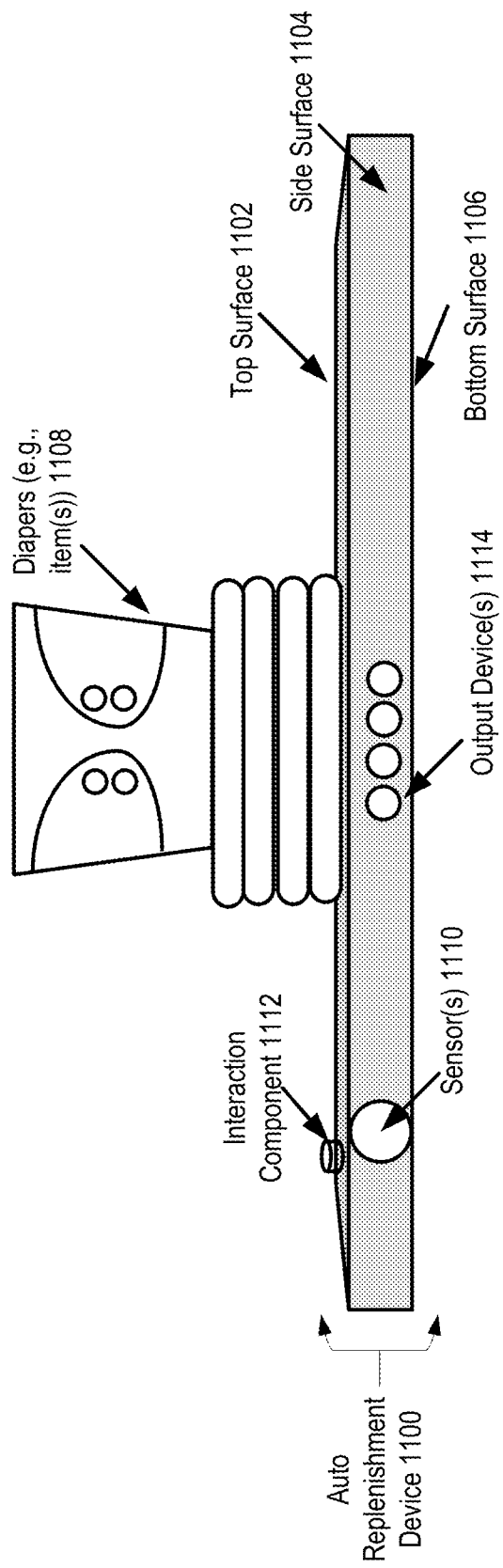
FIG. 11 illustrates an example ARD and items placed on the ARD, in accordance with at least one embodiment.

FIG. 11 illustrates an example ARD and items placed on the ARD, in accordance with at least one embodiment. FIG. 11 includes ARD 1100 which may have a top surface 1102, a side surface 1104, and a bottom surface 1106. One or more items, such as diapers 1108 may be placed on the top surface 1102 of the ARD 1100. The ARD 1100 may be an example of the ARD 104 or 604 from FIGS. 1 and 6. For the purposes of FIG. 11, although the items 1108 may be any type of product or item, the item 1108 is diapers. The bottom surface 1106 may be in contact with a flat or substantially flat surface, such as a counter, table, or shelf. It should be noted that although the ARD 1100 of FIG. 11 represents a shelf which may be of any shape, depth, or size, the ARD 1100 may be a mat or pad in which items 1108 are placed thereon. In embodiments, the ARD 1100 may include one or more sensor(s) 1110. The sensors 1110 may be configured to determine a weight of the items 1108 that are currently placed on the top surface 1102 of the ARD 1100 (i.e., capture or obtain weight measurements of the items 1108). The sensors 1110 may include a weight sensor (e.g., a load sensor, a strain gauge on a load cell, etc.), that is configured to determine/detect a weight/mass of items 1108 placed on the top surface 1102 of the ARD 1100. In accordance with at least one embodiment, the weight of the items 1108 (e.g., sensor data, weight measurements, or property measurements) may include the raw data that was obtained by the sensors 1110 and ARD 1100 that represents a current weight/mass of the items 1108 that are situated on the top surface 1102 of ARD 1100. The weight measurements may indicate a current weight/mass of the items 1108, item volume data that indicates a current volume of the items 1108, and/or item number/quantity data that indicates a number or quantity of the items 1108 situated on the ARD 1100.

As described herein, the ARD 1100 may be configured to transmit, via available networks, the weight measurements or other data captured by sensors 1110 about items 1108 to a service provider computer implementing the sensor based identification feature. In accordance with at least one embodiment, the weight measurements may be utilized by the service provider computers to determine consumption data or a rate of consumption by a user associated with ARD 1100 of the items 1108. The consumption data or rate of consumption may be utilized to generate recommendations to enhance the automatic or non-automatic order and delivery of items on behalf of a user without the user having to take any action or provide any indication regarding their consumption. For example, the service provider computer (618 of FIG. 6) may identify that the current consumption rate for the diapers (items 1108) indicates that the user will run out of the diapers prior to receiving a next order given the current item quantity associated with items 1108 (e.g., currently receiving an order for twenty diapers).

A recommendation may be generated that identifies an update to the quantity such as from twenty diapers to twenty-five diapers resulting in the user not running out of diapers between deliveries. The ARD 1100 may include an interaction component 1112 that is configured to transmit ARD information of ARD 1100 to the service provider computer that corresponds to an identify request. For example, the items 1108 may be exhausted or be removed after cleaning ARD 1100. The user utilizing ARD 1100 may forget which particular item is associated with ARD 1100. As described in FIGS. 1, 2, and 6, the user may interact with the interaction component 1112 which causes the ARD 1100, via communication components, to transmit ARD information to the service provider computers. In response to using interaction component 1112, a user may receive a notification that informs or indicates to them which item is associated with ARD 1100 (e.g., corresponds to the interaction component 1112 they pressed or otherwise interacted with). The ARD may include output devices 1114 such as LED lights or speakers that can be activated by a signal transmitted by the service provider computers and communicated via available networks to ARD 1100. As described with reference to FIGS. 6-8, the output devices 1114 may be configured to activate upon receiving a signal and correspond to a notification provided to a user device that utilized interaction component 1112. For example, given the scenario above of after cleaning ARD 1100, the user may interact with interaction component 1112 and receive a notification on their mobile phone that indicates that the ARD flashing a green light is associated with diapers (items 1108). The output devices 1114 may accordingly flash a green light based on a signal received from the service provider computers that corresponds to the notification thereby identifying which ARD corresponds to which item and more efficiently identifying the ARD for the user.

Figure 12:
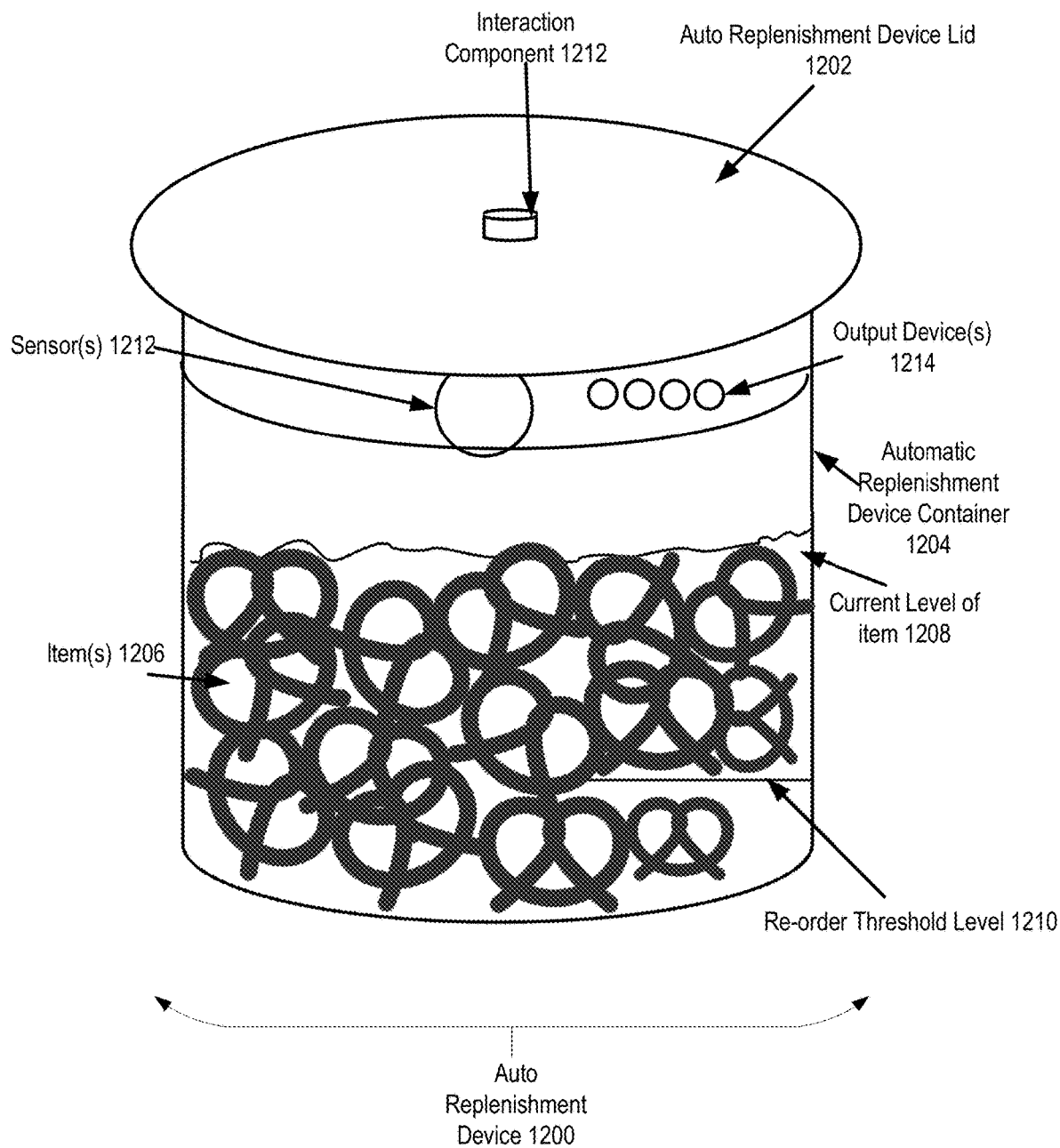
FIG. 12 illustrates an example ARD with items placed within the ARD, in accordance with at least one embodiment.

FIG. 12 illustrates an example ARD with items placed within the ARD, in accordance with at least one embodiment. FIG. 12 includes ARD 1200 that includes an ARD lid 1202, and an ARD container 1204. One or more items 1206, represented by pretzels in FIG. 12, may be stored within the ARD container 1204. FIG. 12 also includes visual representations for a current level of the item 1206 at 1208 and a threshold level 1210. It should be noted that although the ARD 1200 of FIG. 12 includes visual representations of a current level of item at 1208 and a re-order threshold level 1210, these depictions are for clarification of aspects of the embodiments described herein. For example, a current level of item 1208 may be determined by service provider computers based on sensor data obtained by sensors 1212 and maintained in a user profile that is generated and stored by the service provider computers. As described herein, the re-order threshold level may be determined by the service provider computers based on the consumption data that is derived from the sensor data obtained by the sensors 1212 where the re-order threshold level 1210 is stored and associated with a user profile maintained by the service provider computers.

It should be noted that the ARD 1200 of FIG. 12 represents a container which may be of any shape, depth, or size, in which items 1206 are placed within. In embodiments, the ARD 1200 may include one or more sensor(s) 1212 that may be configured to determine a distance of the items 1206 that are currently placed within or stored by the ARD container 1204 of the ARD 1200 (i.e., capture or obtain distance measurements of the items 1206). The sensors 1212 may include a time of flight sensor (e.g., a time of flight camera, a time of flight transmitter and receiver combination, etc.), that is configured to determine/detect a distance/amount of items 1206 placed in the ARD container 1204 of the ARD 1200 based at least in part on the time of flight for a signal to be emitted from the sensors 1212 to a current level of the item 1206 (e.g., 1208) or to a surface area of the items 1206. In accordance with at least one embodiment, the distance measurements of the items 1206 to the sensors 1212 (e.g., sensor data, distance measurements, or property measurements) may include the raw data that was obtained by the sensors 1212 and ARD 1200 that represents a current distance/amount of the items 1206 that are situated within the ARD container 1204 of ARD 1200 from the sensors 1212 and the items 1206.

The distance measurements may indicate a current distance/amount of the items 1206, item volume data that indicates a current volume of the items 1206, and/or item number/quantity data that indicates a number or quantity of the items 1206 situated in the ARD container 1204 of ARD 1200. The ARD 1200 and sensors 1212 may be configured to utilize any suitable time of flight signal technology between the sensors 1212 and the items 1206 within the ARD container 1204. Although the ARD 1200 of FIG. 12 includes the sensors 1212 within or on a surface of the ARD lid 1202, the sensors 1212 may be placed on one or more interior surfaces of the ARD container 1204. Time of flight signal technology can include any electronic signal technology that can determine the elapsed time period between a transmission of a signal from a source and a return of the signal, or at least a portion thereof, back to the source. Other configurations such as a signal source and signal detector may also be utilized to determine time of flight and distance between the sensors 1212 and items 1206 (e.g., current level of item 1208) utilizing a source/detector or transmitter/receiver. In embodiments, the service provider computers may be configured to determine a distance from the sensors 1212 and items 1206 (e.g., current level of item 1208) using the sensor data obtained by the sensors 1212.

For example, the elapsed time period between the transmission of a signal from a source to detection of the signal (e.g., from the sensors 1212), or at least a portion thereof, at a detector or receiver, along with the known speed of the signal (e.g., the speed of light) may be utilized to determine the distance between the source of the signal (e.g., sensors 1212) and the items 1206. The ARD 1200 may be configured to transmit the sensor data obtained by sensors 1212 to the service provider computers for determining the distance between the sensors 1212 and the current level of item 1208 and correlate the distance to an amount of item left in the ARD container 1204 of ARD 1200. The sensor data may be used to determine the consumption data or consumption rate of items 1206 and in embodiments reorder the items 1206 upon the amount of the item being equal to or less than the threshold level 1210.

In accordance with at least one embodiment, the ARD 1200 may include an interaction component 1212 that is configured to transmit ARD information of ARD 1200 to the service provider computer that corresponds to an identify request. For example, the items 1206 may be exhausted or be removed after cleaning ARD 1200. The user utilizing ARD 1200 may forget which particular item is associated with ARD 1200. As described in FIGS. 1, 2, and 6, the user may interact with the interaction component 1212 which causes the ARD 1200, via communication components, to transmit ARD information to the service provider computers. In response to using interaction component 1212, a user may receive a notification that informs or indicates to them which item is associated with ARD 1200 (e.g., corresponds to the interaction component 1212 they pressed or otherwise interacted with). The ARD may include output devices 1214 such as LED lights or speakers that can be activated by a signal transmitted by the service provider computers and communicated via available networks to ARD 1200. As described with reference to FIGS. 6-8, the output devices 1214 may be configured to activate upon receiving a signal and correspond to a notification provided to a user device that utilized interaction component 1212. For example, given the scenario above of after cleaning ARD 1200, the user may interact with interaction component 1212 and receive a notification on their tablet computer that indicates that the ARD emitting a sound is associated with pretzels (items 1206). The output devices 1214 may accordingly emit a sound based on a signal received from the service provider computers that corresponds to the notification thereby identifying which ARD corresponds to which item and more efficiently identifying the ARD for the user.

Figure 13:
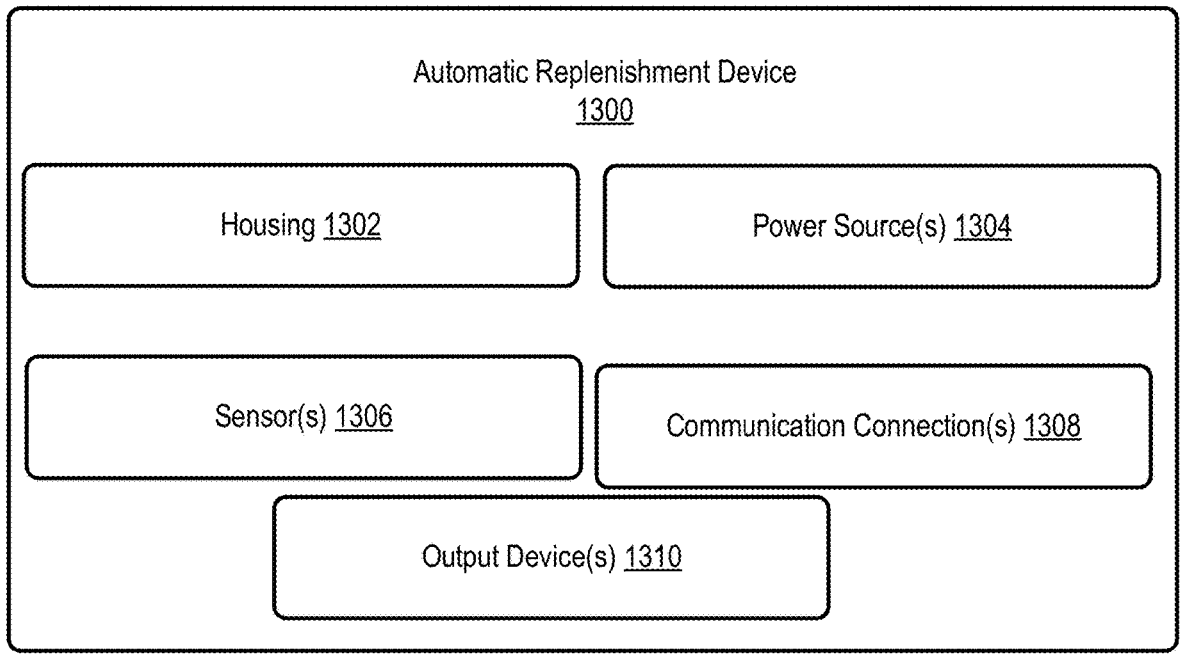
FIG. 13 illustrates a block diagram of components of an ARD, in accordance with at least one embodiment.

FIG. 13 illustrates a block diagram of components of an ARD, in accordance with at least one embodiment. The ARD 1300 of FIG. 13 may be an example of the ARD 104, 604, or 1432 from FIGS. 1, 6, and 14. The ARD 1300 may include a housing 1302 that may include components of ARD 1300 such as power source 1304, sensors 1306, communication connections 1308, and output devices (output components) 1310. In embodiments, the housing 1302 may be composed of any type of material (e.g., plastic, metal, etc.), and may server to prevent the components of the ARD 1300 from being damaged or interacting or otherwise contaminating the items placed on or within ARD 1300. The ARD 1300 may include one or more power source(s) 1304 that provide power to one or more components of the ARD 1300. The power sources 1304 may include a battery, which may include a one-time use battery or a rechargeable battery. However, the power sources 1304 may rely on power from another source providing alternating current (AC) power and may be a power inverter. For example, the ARD may be powered via a power cord that is coupled to the ARD 1300 and that is detachably connected to a power outlet, such as a wall outlet. In some embodiments, the ARD 1300 may include a power level detector that is configured to determine and display a power level for the ARD using alphanumeric characters that indicate a current power level of a battery of the ARD 1300 and power sources 1304.

In embodiments, the ARD 1300 may include one or more sensors 1306 such as a weight sensor 1310, a time of flight sensor 1312, or other suitable sensors such as time of flight camera sensors, scale sensors, or infrared sensors that are configured to obtain or capture sensor data of items placed within or on ARD 1300. In embodiments, the weight sensors may include one or more load cells, such as hydraulic load cells, pneumatic load cells, strain gauge load cells, and/or piezoelectric load cells. The time of flight sensors may include signal transmitters and receivers that are configured to determine an amount of an item stored within the ARD 1300 or calculate a distance from the source of the signal to the receptor of the signal which can be converted into an amount of the item stored in the container ARD 1300. The sensors 1306 may include microelectromechanical systems (MEMS) pressure sensors that are configured to detect whether items are situated on a top surface of ARD 1300 and/or detect an amount (e.g., weight, volume, number/quantity, etc.) of items. The sensors 1306 may periodically obtain measurement properties (e.g., weight measurements or distance measurements) at periodic or predetermined intervals such as every day, every hour, every minute, etc. In some embodiments the sensors 1306 may be configured to detect/sense when an item has been interacted with (e.g., placed on top surface of ARD 1300, the ARD lid of ARD 1300 is removed, etc.) which causes the sensor 1306 to capture the weight measurements or distance measurements.

In embodiments, the ARD 1300 may include one or more communication connections 1308. The communications may include suitable communication interfaces for communicating via Bluetooth (Bluetooth Low Energy (BLE)), WiFi, a cellular connection (e.g., 3G, 4G, LTE, etc.). The communication connections 1308 may be configured to transmit the raw sensor data obtained by sensors 1306 and ARD information or data (e.g., ARD identifier and registration token) to a service provider computer or relay the sensor data to the service provider computer using a proximal user device. Other known or widely used communication protocols may be utilized to transmit the sensor data of sensors 1306 and the ARD information or data to the service provider computer such as a wireless connection (WiFi network), a wired connection to a network, cellular network, short-range or near-field networks (e.g., Bluetooth), infrared signals, local area networks, wide area networks, the Internet, etc. The communication connections 1308 may be configured to utilize a certain application program interface (API) call to transmit the ARD information to data via the communication connections 1308 to the service provider computers. The ARD 1300 may include one or more output devices 1310 that are configured to activate upon receiving a signal from the service provider computers via communication connections 1308. For example, the output devices 1310 may include LED lights that are configured to activate for a certain period of time to aid a user in identifying the ARD 1300 and which item is associated with ARD 1300 as described with reference to FIGS. 6-8.

Figure 14:
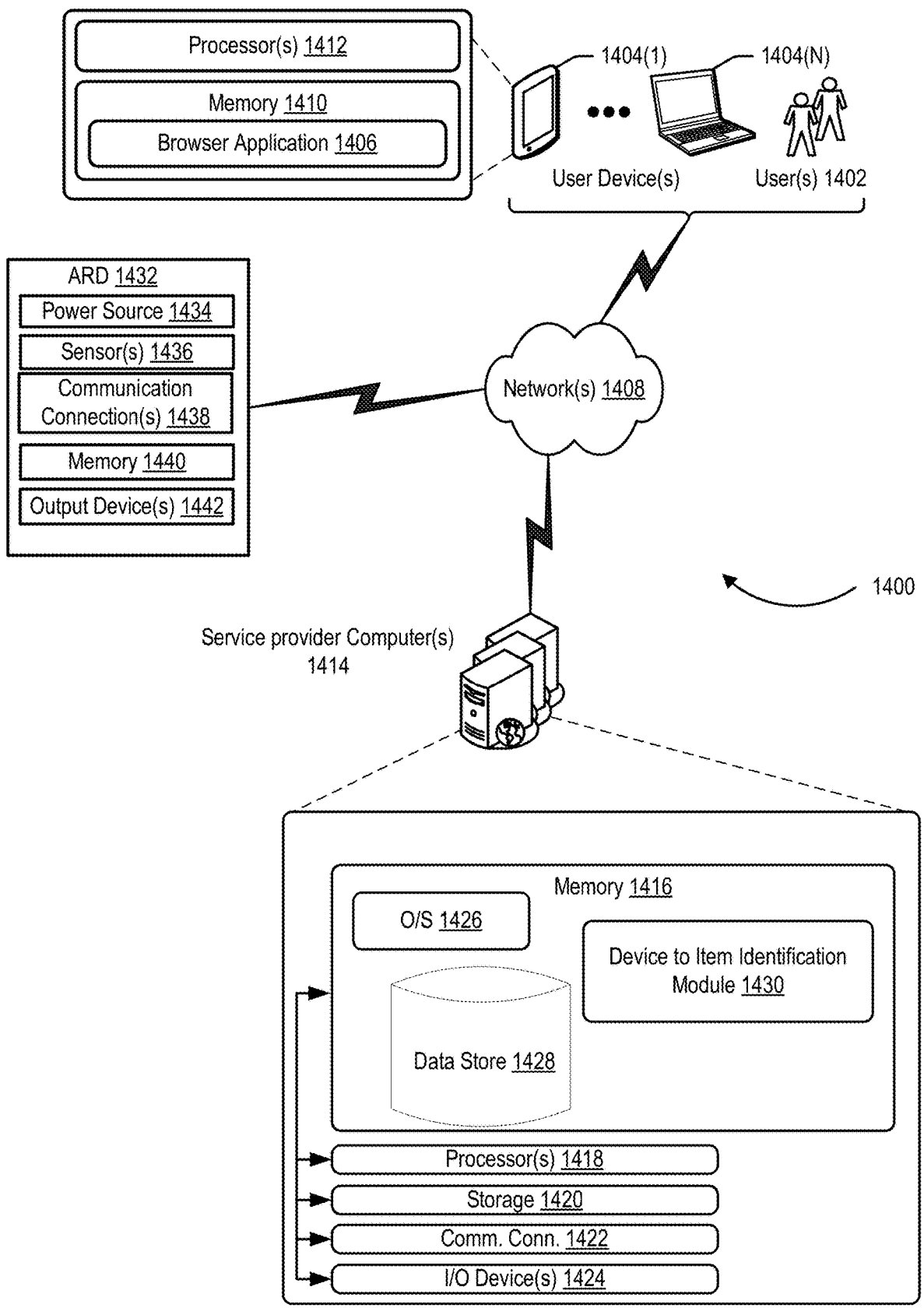
FIG. 14 illustrates an example architecture for implementing a sensor based device identification feature as described herein that includes one or more service provider computers, a user device, and/or an ARD connected via one or more networks, in accordance with at least one embodiment.

FIG. 14 illustrates an example architecture for implementing a sensor based device identification feature as described herein that includes one or more service provider computers, a user device, and/or an ARD connected via one or more networks, in accordance with at least one embodiment. In architecture 1400, one or more users 1402 (e.g., customers, users, consumers, etc.,) may utilize user computing devices 1404(1)-(N) (collectively, user devices 1404) to access a browser application 1406 or a user interface (UI) accessible through the browser application 1406, via one or more networks 1408 to request interact with a notification generated according to the sensor based device identification features disclosed herein. In embodiments, the one or more users 1402 may utilize user computing devices 1404(1)-(N) to access the browser application 1406 or a UI accessible through the browser application 1406, via one or more networks 1408, to request content from a third party computer (not pictured). The "browser application" 1406 can be any browser control or native application that can access and display a network page or other information such as a user interface of a native software application for enabling the interaction with a notification and/or an ARD user interface as disclosed herein. A native software application may include an application or program that has been developed for use on a particular platform (such as an operating system) or a particular device (such as a particular type of mobile device or user device 1404). In embodiments, the user device 1404 may include one or more components for enabling the user 1402 to interact with the browser application 1406.

The user devices 1404 may include at least one memory 1410 and one or more processing units or processor(s) 1412. The memory 1410 may store program instructions that are loadable and executable on the processor(s) 1412, as well as data generated during the execution of these programs. Depending on the configuration and type of the user devices 1404, the memory 1410 may be volatile (such as random access memory (RAM)) and/or non-volatile (such as read-only memory (ROM), flash memory, etc.). The user devices 1404 may also include additional removable storage and/or non-removable storage including, but not limited to, magnetic storage, optical disks, and/or tape storage. The disk drives and their associated non-transitory computer-readable media may provide non-volatile storage of computer-readable instructions, data structures, program modules, and other data for the user devices 1404. In some implementations, the memory 1410 may include multiple different types of memory, such as static random access memory (SRAM), dynamic random access memory (DRAM), or ROM.

Turning to the contents of the memory 1410 in more detail, the memory 1410 may include an operating system and one or more application programs or services for implementing the features disclosed herein. Additionally, the memory 1410 may include one or more modules for implementing the features described herein including the device to item identification module 1430.

The architecture 1400 may also include one or more service provider computers 1414 that may, in some examples, provide computing resources such as, but not limited to, client entities, low latency data storage, durable data store, data access, management, virtualization, hosted computing environment or "cloud-based" solutions, electronic content performance management, media streaming services, content generation, etc. The service provider computers 1414 may implement or be an example of the service provider computer(s) described herein with reference to FIGS. 1-13 and throughout the disclosure. The one or more service provider computers 1414 may also be operable to provide site hosting, media streaming services, computer application development, and/or implementation platforms, combinations of the foregoing, or the like to the one or more users 1402 via user devices 1404.

In some examples, the networks 1408 may include any one or a combination of many different types of networks, such as cable networks, the Internet, wireless networks, cellular networks, and other private and/or public networks. While the illustrated examples represent the users 1402 communicating with the service provider computers 1414 over the networks 1408, the described techniques may equally apply in instances where the users 1402 interact with the one or more service provider computers 1414 via the one or more user devices 1404 over a landline phone, via a kiosk, or in any other manner. It is also noted that the described techniques may apply in other client/server arrangements (e.g., set-top boxes, etc.), as well as in non-client/server arrangements (e.g., locally stored applications, peer-to-peer arrangements, etc.).

The one or more service provider computers 1414 may be any type of computing devices such as, but not limited to, a mobile phone, a smart phone, a personal digital assistant (PDA), a laptop computer, a desktop computer, a server computer, a thin-client device, a tablet PC, etc. Additionally, it should be noted that in some embodiments, the one or more service provider computers 1414 may be executed by one or more virtual machines implemented in a hosted computing environment. The hosted computing environment may include one or more rapidly provisioned and released computing resources, which computing resources may include computing, networking, and/or storage devices. A hosted computing environment may also be referred to as a cloud computing environment or distributed computing environment. In some examples, the one or more service provider computers 1414 may be in communication with the user device 1404 via the networks 1408, or via other network connections. The one or more service provider computers 1414 may include one or more servers, perhaps arranged in a cluster or as individual servers not associated with one another.

In one illustrative configuration, the one or more service provider computers 1414 may include at least one memory 1416 and one or more processing units or processor(s) 1418.

The processor(s) 1418 may be implemented as appropriate in hardware, computer-executable instructions, firmware, or combination thereof. Computer-executable instruction or firmware implementations of the processor(s) 1418 may include computer-executable or machine-executable instructions written in any suitable programming language to perform the various functions described when executed by a hardware computing device, such as a processor. The memory 1416 may store program instructions that are loadable and executable on the processor(s) 1418, as well as data generated during the execution of these programs. Depending on the configuration and type of the one or more service provider computers 1414, the memory 1416 may be volatile (such as RAM) and/or non-volatile (such as ROM, flash memory, etc.). The one or more service provider computers 1414 or servers may also include additional storage 1420, which may include removable storage and/or non-removable storage. The additional storage 1420 may include, but is not limited to, magnetic storage, optical disks and/or tape storage. The disk drives and their associated computer-readable media may provide non-volatile storage of computer-readable instructions, data structures, program modules, and other data for the computing devices. In some implementations, the memory 1416 may include multiple different types of memory, such as SRAM, DRAM, or ROM.

The memory 1416, the additional storage 1420, both removable and non-removable, are all examples of non-transitory computer-readable storage media. For example, computer-readable storage media may include volatile or non-volatile, removable or non-removable media implemented in any method or technology for storage of information such as computer-readable instructions, data structures, program modules, or other data. The memory 1416 and the additional storage 1420 are all examples of non-transitory computer storage media. Additional types of non-transitory computer storage media that may be present in the one or more service provider computers 1414 may include, but are not limited to, PRAM, SRAM, DRAM, RAM, ROM, EEPROM, flash memory or other memory technology, CD-ROM, DVD, or other optical storage, magnetic cassettes, magnetic tape, magnetic disk storage or other magnetic storage devices, or any other medium which can be used to store the desired information and which can be accessed by the one or more service provider computers 1414. Combinations of any of the above should also be included within the scope of non-transitory computer-readable media.

The one or more service provider computers 1414 may also contain communication connection interface(s) 1422 that allow the one or more service provider computers 1414 to communicate with a data store, another computing device or server, user terminals, and/or other devices on the networks 1408. The one or more service provider computers 1414 may also include I/O device(s) 1424, such as a keyboard, a mouse, a pen, a voice input device, a touch input device, a display, speakers, a printer, etc.

Turning to the contents of the memory 1416 in more detail, the memory 1416 may include an operating system 1426, one or more data stores 1428, and/or one or more application programs or services for implementing the features disclosed herein including the device to item identification module 1430. In accordance with at least one embodiment, the device to item identification module 1430 may be configured to receive and process identify requests corresponding to interactions of a user with an ARD. The device to item identification module 1430 may determine an identify request based on information (ARD information or data) transmitted by the ARD to the service provider computers 1414, map or otherwise lookup an associated ARD and corresponding item for the ARD, and generate a notification to inform the user of the ARD to item pairing that correspond to the identify request. The device to item identification module 1430 may be configured to generate an ARD user interface in response to an indication that a user (1402) has interacted with the transmitted notification via an associated user device (1404). As described with FIGS. 2, 3, 7, and 8, a user may interact with the ARD user interface to update a number of options with the ARD and associated item as well as interact with data elements to achieve other features associated with the sensor based device identification features disclosed herein. The device to item identification module 1430 may be configured to determine and transmit a signal to output components of the ARD to enable a user to identify an ARD to item pairing. The architecture of FIG. 14 also includes an ARD 1432 that further includes a power source 1434, sensors 1436, communication connections 1438, memory 1440, and output devices (output components) 1442. The ARD 1432 may be an example of ARDs 104, 604, 1100, or 1200 from FIGS. 1, 6, 11, and 12. The configuration and functionality of components 1434, 1436, 1438, and 1442 are disclosed above with respect to FIG. 13. Depending on the configuration and type of the ARD 1432, the memory 1440 may be volatile (such as RAM) and/or non-volatile (such as ROM, flash memory, etc.). As disclosed herein, the ARD 1432 may be configured to obtain sensor data using sensors 1436 about items stored by or contained by ARD 1432 that indicates an amount of the item stored or contained by ARD 1432. In embodiments, the ARD 1432 may be configured to utilize the communication connections 1438 to transmit the sensor data of sensors 1436 and ARD data or information, via networks 1408, to the service provider computers 1414 for determining a consumption rate or consumption data for the item stored by or contained within the ARD 1432 as well as processing identify requests for ARD 1432 to determine an ARD to item pairing as disclosed herein.

Figure 15:
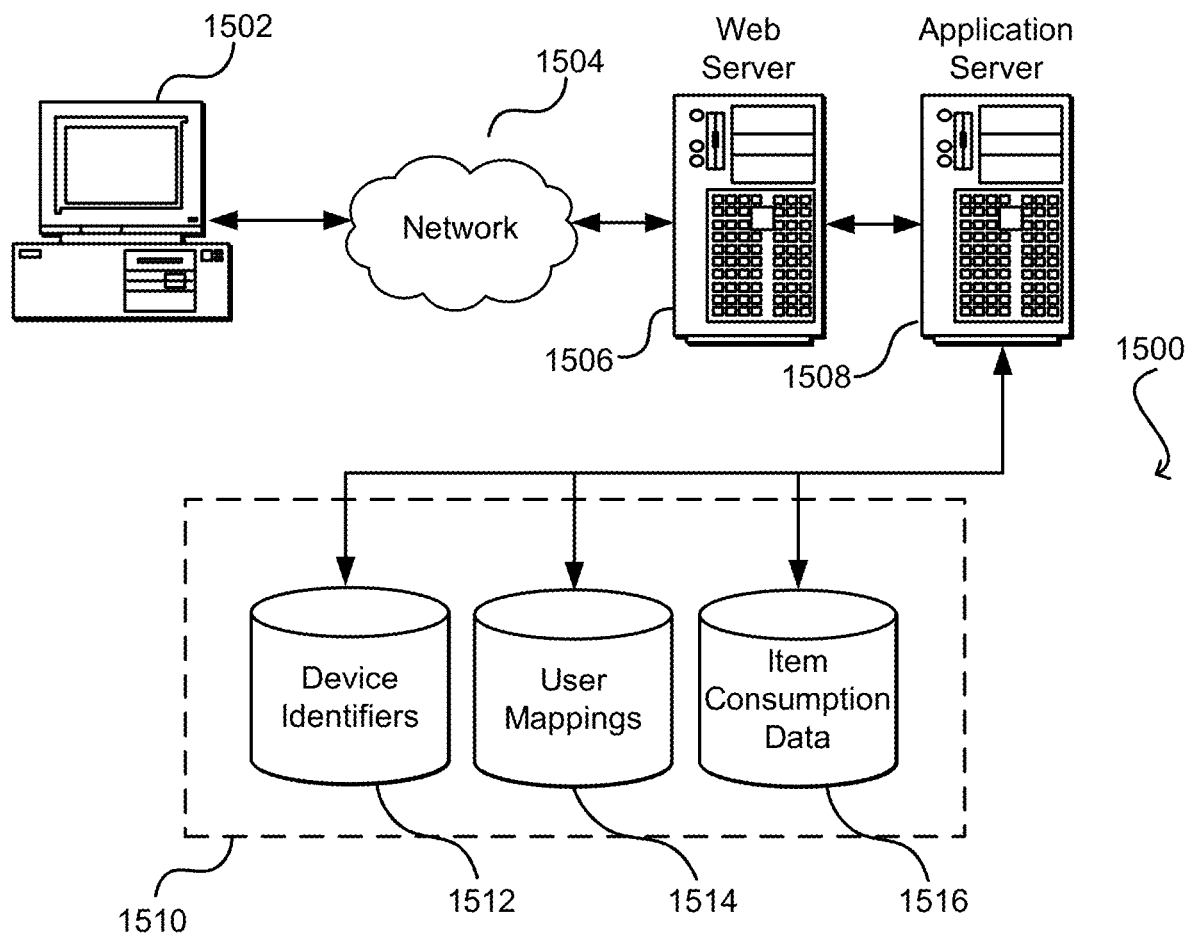
FIG. 15 illustrates an environment in which various embodiments can be implemented.

FIG. 15 illustrates aspects of an example environment 1500 for implementing aspects in accordance with various embodiments. As will be appreciated, although a Web-based environment is used for purposes of explanation, different environments may be used, as appropriate, to implement various embodiments. The environment includes an electronic client device 1502, which can include any appropriate device operable to send and receive requests, messages, or information over an appropriate network 1504 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 1506 for receiving requests and serving content in response thereto, although for other networks an alternative device serving a similar purpose could be used as would be apparent to one of ordinary skill in the art.

The illustrative environment includes at least one application server 1508 and a data store 1510. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio, and/or video to be transferred to the user, which may be served to the user by the Web server in the form of HyperText Markup Language ("HTML"), Extensible Markup Language ("XML"), or another appropriate structured language in this example. The handling of all requests and responses, as well as the delivery of content between the client device 1502 and the application server 1508, can be handled by the Web server. It should be understood that the Web and application servers are not required and are merely example components, as structured code discussed herein can be executed on any appropriate device or host machine as discussed elsewhere herein.

The data store 1510 can include several separate data tables, databases or other data storage mechanisms and media for storing data relating to a particular aspect. For example, the data store illustrated includes mechanisms for storing device identifiers 1512 and item consumption data 1516, which can be used to serve content for the production side, identify or map device identifiers to products associated with a user, generate notifications for identifying a container to an item or product in response to an identify request, generate a signal for activating an output device of an ARD for identification purposes, determine a consumption rate for an item associated with an ARD, automatically order an item on behalf of a user based on the consumption rate and an auto-reorder or refill threshold associated with the ARD/item, or associate the ARD with a new item. The data store also is shown to include a mechanism for storing user mappings 1514, which can be used for reporting, analysis, or other such purposes such as identifying a device (ARD) with a user and item associated with the ARD. It should be understood that there can be many other aspects that may need to be stored in the data store, such as for page image information and to access right information, which can be stored in any of the above listed mechanisms as appropriate or in additional mechanisms in the data store 1510. The data store 1510 is operable, through logic associated therewith, to receive instructions from the application server 1508 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the user device 1502. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 15. Thus, the depiction of the system 1500 in FIG. 15 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including Hypertext Transfer Protocol ("HTTP") servers, FTP servers, Common Gateway Interface ("CGP") servers, data servers, Java servers, and business application servers. The server(s) also may be capable of executing programs or scripts in response to requests from user devices, such as by executing one or more Web applications that may be implemented as one or more scripts or programs written in any programming language, such as Java®, C, C #, or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired)), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
receiving, by a computer system and from an automatic replenishment device (ARD), information in response to a first interaction with a component of the ARD, the information including a device identifier for the ARD and a registration token, the ARD comprising an output component that is configured to be activated in response to receiving a signal;
determining, by the computer system, that the information is associated with an identify request to identify an item associated with the ARD based at least in part on the information;
determining, by the computer system, ARD data for the ARD and the item associated with the ARD based at least in part on the information including the device identifier;
generating, by the computer system, a notification based at least in part on the ARD data and the item associated with the ARD, the notification identifying that the item is associated with the ARD;
transmitting, by the computer system, the notification to a user device associated with the ARD;
generating and transmitting, by the computer system, the signal to the output component of the ARD thereby activating the output component of the ARD that corresponds to the identify request;
receiving, by the computer system and from the user device, an indication of a second interaction with the notification;
generating, by the computer system, an ARD user interface that is configured to present the ARD data of the ARD and the item associated with the ARD based at least in part on the second interaction; and
transmitting, by the computer system, the ARD user interface to the user device.

2. The computer-implemented method of claim 1, wherein the ARD user interface includes a data object that is configured to update an automatic re-order threshold associated with the ARD and the item.

3. The computer-implemented method of claim 1, wherein the ARD user interface includes a data object that is configured to update a name or designation associated with the ARD.

4. The computer-implemented method of claim 1, wherein the ARD user interface includes a data object that is configured to associate a new item with the ARD and disassociate the item with the ARD.

5. A computer-readable storage medium storing computer-executable instructions that, when executed by a computer system, configure the computer system to perform operations comprising:
receiving information from an automatic replenishment device (ARD) that corresponds to an identify request based at least in part on a first interaction with a component of the ARD, the information including a device identifier for the ARD, the ARD comprising an output component that is configured to be activated in response to receiving a signal;
identifying ARD data for the ARD and an item associated with the ARD based at least in part on the information including the device identifier;
generating a notification based at least in part on the ARD data, the notification configured to present the item associated with the ARD;
transmitting the notification to a user device associated with the ARD; and
generating and transmitting the signal to the output component of the ARD thereby activating the output component of the ARD that corresponds to the identify request.

6. The computer-readable storage medium of claim 5, wherein the operations further comprise:
receiving, from the user device, an indication of a second interaction with the notification;
generating an ARD user interface to present the ARD data and the item based at least in part on the second interaction and the ARD data; and
transmitting, to the user device, the ARD user interface.

7. The computer-readable storage medium of claim 6, wherein the indication of the second interaction with the notification includes a login session token and wherein generating the ARD user interface is further based at least in part on the login session token.

8. The computer-readable storage medium of claim 6, wherein the ARD user interface is configured to present sensor data corresponding to a time period when sensors of the ARD were previously activated.

9. The computer-readable storage medium of claim 8, wherein the sensors of the ARD were previously activated in response to a third interaction with a lid component of the ARD.

10. The computer-readable storage medium of claim 5, wherein the information further includes a registration token, the registration token being initialized by a user associated with the ARD during an initial pairing of the ARD to the item.

11. The computer-readable storage medium of claim 5, wherein the information is received from the ARD using a particular application programming interface (API) call.

12. The computer-readable storage medium of claim 11, wherein the operations further comprise determining that the information from the ARD corresponds to the identify request based at least in part on the API call.

13. The computer-readable storage medium of claim 5, wherein the first interaction with the component of the ARD includes at least one of a manual interaction by a user with the component of the ARD, a voice command interaction by the user with the component of the ARD, or a gesture interaction by the user with the component of the ARD.

14. A computer system comprising:
a memory configured to store computer-executable instructions; and
a processor in communication with the memory configured to execute the computer-executable instructions to at least:
identify automatic replenishment device (ARD) data and a corresponding item for the ARD in response to receiving a device identifier for the ARD, the device identifier for the ARD provided in response to a first interaction with the ARD, the ARD comprising an output component that is configured to be activated in response to receiving a signal;
generate a notification based at least in part on the ARD data, the notification configured to present the item associated with the ARD;
transmit the notification to a user device associated with the ARD; and generate and transmit the signal to the output component of the ARD thereby activating the output component of the ARD that corresponds to the notification.

15. The computer system of claim 14, wherein the processor is further configured to:
receive, from the user device, an indication of a second interaction with the notification;
generate an ARD user interface to present the ARD data and the corresponding item based at least in part on the second interaction and the ARD data; and
transmit, to the user device, the ARD user interface.

16. The computer system of claim 15, wherein the processor is further configured to:
generate a plurality of notifications based at least in part on a plurality of interactions with a plurality of ARDs; and
transmit, to the user device, the plurality of notifications, each notification of the plurality of notifications identifying an item-to-ARD pairing that corresponds to one of the interactions of the plurality of interactions.

17. The computer system of claim 16, wherein each notification of the plurality of notifications is configured to direct a user of the user device to a corresponding ARD user interface for the item-to-ARD pairing.

18. The computer system of claim 16, wherein the ARD user interface is configured to enable a user of the user device to dismiss each notification of the plurality of notifications.

19. The computer system of claim 16, wherein the processor is further configured to combine the plurality of notifications into an aggregated notification that is transmitted to the user device.

20. The computer system of claim 19, wherein the aggregated notification is configured to present each notification of the plurality of notifications in an order that corresponds to the order of the plurality of interactions with the plurality of ARDs.

* * * * *

UNITED STATES PATENT AND TRADEMARK OFFICE
CERTIFICATE OF CORRECTION

PATENT NO. : 10,853,870 B2
APPLICATION NO. : 15/928370
DATED : December 1, 2020
INVENTOR(S) : Kramer et al.

Page 1 of 1

It is certified that error appears in the above-identified patent and that said Letters Patent is hereby corrected as shown below:

On the Title Page

Item (72), inventors, should read:
Allison Kramer, Seattle, WA;
Kevin Chu, Seattle, WA;
Samuel Stevens Heyworth, Seattle, WA;
Devon Merritt, Seattle, WA;
Amirali Virani, Bellevue, WA;
Hannah McClellan Richards, Boise, ID Signed and Sealed this
Twenty-first Day of September, 2021

Drew Hirshfeld
*Performing the Functions and Duties of the*
*Under Secretary of Commerce for Intellectual Property and*
*Director of the United States Patent and Trademark Office*